(12) United States Patent
Mitsumoto et al.

(10) Patent No.: US 9,136,706 B2
(45) Date of Patent: Sep. 15, 2015

(54) POWER MANAGEMENT SYSTEM AND POWER MANAGEMENT METHOD

(75) Inventors: Kenji Mitsumoto, Kanagawa (JP); Dai Murayama, Tokyo (JP); Masaaki Saito, Tokyo (JP); Yoshikazu Ooba, Tokyo (JP); Shingo Tamaru, Tokyo (JP); Yasuo Takagi, Kanagawa (JP); Nobutaka Nishimura, Tokyo (JP); Yutaka Iino, Kanagawa (JP); Shuichi Yamaguchi, Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 373 days.

(21) Appl. No.: 13/576,518

(22) PCT Filed: Jun. 18, 2012

(86) PCT No.: PCT/JP2012/065526
§ 371 (c)(1),
(2), (4) Date: Aug. 1, 2012

(87) PCT Pub. No.: WO2013/099323
PCT Pub. Date: Jul. 4, 2013

(65) Prior Publication Data
US 2013/0173075 A1 Jul. 4, 2013

(30) Foreign Application Priority Data
Dec. 28, 2011 (JP) ................. 2011-289493

(51) Int. Cl.
*G05D 5/00* (2006.01)
*H02J 3/00* (2006.01)
*H02J 3/14* (2006.01)

(52) U.S. Cl.
CPC .... *H02J 3/00* (2013.01); *H02J 3/14* (2013.01); *H02J 2003/003* (2013.01); *Y04S 10/54* (2013.01)

(58) Field of Classification Search
USPC .......... 700/19, 21, 22, 90, 291, 297; 702/106, 702/188, 57, 60, 61, 62
See application file for complete search history.

(56) References Cited

U.S. PATENT DOCUMENTS

2007/0276547 A1* 11/2007 Miller .......................... 700/295
2009/0012654 A1* 1/2009 Culp et al. .................... 700/291
(Continued)

FOREIGN PATENT DOCUMENTS

| CN | 101903871 A | 12/2010 |
|----|-------------|---------|
| JP | 2002 22239 | 1/2002 |

(Continued)

OTHER PUBLICATIONS

International Search Report Issued Aug. 28, 2012 in PCT/JP12/65526 Filed Jun. 18, 2012.
(Continued)

*Primary Examiner* — Darrin Dunn
*Assistant Examiner* — MD N Mia
(74) *Attorney, Agent, or Firm* — Oblon, McClelland, Maier & Neustadt, L.L.P.

(57) ABSTRACT

A power management system includes: customer terminals; and a power management apparatus connected to the customer terminals, wherein each of the customer terminals includes a weather forecast acquisition unit that acquires a local weather forecast for a corresponding customer terminal, and a power prediction unit that predicts a power consumption and an amount of power that can be reduced for a predetermined period based on the weather forecast, and the power management apparatus includes an integration processing unit that integrates the power consumptions and the amounts of power that can be reduced that are predicted for the respective customer terminals to calculate a total power consumption and a total amount of power that can be reduced for all of the customer terminals.

6 Claims, 17 Drawing Sheets

(56) References Cited

U.S. PATENT DOCUMENTS

| | | |
|---|---|---|
| 2010/0141046 A1 | 6/2010 | Paik |
| 2010/0222934 A1 | 9/2010 | Iino et al. |
| 2011/0172841 A1* | 7/2011 | Forbes, Jr. .................... 700/292 |
| 2011/0270459 A1 | 11/2011 | Murai et al. |
| 2012/0179596 A1 | 7/2012 | Mitsumoto et al. |

FOREIGN PATENT DOCUMENTS

| | | | | |
|---|---|---|---|---|
| JP | 2004-274822 | * | 5/2003 | ................ H02J 3/00 |
| JP | 2004 274822 | | 9/2004 | |
| JP | 3564605 | | 9/2004 | |
| JP | 2005 90780 | | 4/2005 | |
| JP | 2005 94891 | | 4/2005 | |
| JP | 2009 303411 | | 12/2009 | |
| JP | 2010 204833 | | 9/2010 | |
| JP | 2012-147546 | | 8/2012 | |
| WO | 2010 065197 | | 6/2010 | |
| WO | WO 2010/065198 A2 | | 6/2010 | |

OTHER PUBLICATIONS

Written Opinion of the International Search Authority Issued Aug. 15, 2012 in PCT/JP12/65526 Filed Jun. 18, 2012.

Combined Office Action and Search Report issued Jan. 29, 2015 in Chinese Patent Application No. 201280000630.8 (with English Translation of Category of Cited Documents).

* cited by examiner

FIG.12

| | DATE | TIME | WEATHER FORECAST VALUE | | | | | | | | | |
|---|---|---|---|---|---|---|---|---|---|---|---|---|
| | | | TEMPER-ATURE | HUMIDITY | $CO_2$ CONCEN-TRATION | WIND DIRECTION | WIND VELOCITY | WEATHER | AMOUNT OF SOLAR RADIATION | AMOUNT OF CLOUD | AMOUNT OF PRECIPI-TATION | AMOUNT OF SNOWFALL |
| AREA A1 | 2011/8/1 | 18:00 | 21.00 | 46 | 400 | 8 | 6.8 | 003 | 0.25 | 9 | 0.0 | 0.0 |
| | 2011/8/1 | 19:00 | 20.20 | 55 | 407 | 8 | 5 | 003 | 0.02 | 9 | 0.0 | 0.0 |
| | 2011/8/1 | 20:00 | 20.00 | 58 | 408 | 8 | 3.1 | 003 | 0.00 | 9 | 0.0 | 0.0 |
| | 2011/8/1 | 21:00 | 19.60 | 63 | 410 | 8 | 3.8 | 003 | 0.00 | 9 | 0.0 | 0.0 |
| | 2011/8/1 | 22:00 | 19.60 | 63 | 412 | 8 | 3.3 | 003 | 0.00 | 9 | 0.0 | 0.0 |
| | 2011/8/1 | 23:00 | 19.30 | 65 | 413 | 8 | 2.6 | 003 | 0.00 | 9 | 0.0 | 0.0 |
| | 2011/8/2 | 0:00 | 19.00 | 67 | 413 | 7 | 2.4 | 003 | 0.00 | 9 | 0.0 | 0.0 |
| | 2011/8/2 | 1:00 | 18.60 | 60 | 412 | 9 | 4.7 | 003 | 0.00 | 9 | 0.0 | 0.0 |
| | 2011/8/2 | 2:00 | 18.50 | 62 | 411 | 10 | 4.4 | 003 | 0.00 | 9 | 0.0 | 0.0 |
| | 2011/8/2 | 3:00 | 18.40 | 61 | 409 | 9 | 5.4 | 003 | 0.00 | 9 | 0.0 | 0.0 |
| | 2011/8/2 | 4:00 | 18.40 | 60 | 408 | 9 | 4.5 | 003 | 0.00 | 9 | 0.0 | 0.0 |
| | 2011/8/2 | 5:00 | 18.30 | 61 | 408 | 9 | 5.6 | 003 | 0.00 | 10 | 0.0 | 0.0 |
| | 2011/8/2 | 6:00 | 18.40 | 62 | 410 | 10 | 3.8 | 003 | 0.19 | 10 | 0.0 | 0.0 |
| | 2011/8/2 | 7:00 | 19.10 | 60 | 414 | 9 | 4.4 | 003 | 0.60 | 10 | 0.0 | 0.0 |
| | 2011/8/2 | 8:00 | 20.00 | 55 | 414 | 9 | 3.9 | 003 | 1.12 | 10 | 0.0 | 0.0 |
| | 2011/8/2 | 9:00 | 21.30 | 51 | 407 | 10 | 3.9 | 003 | 1.59 | 10 | 0.0 | 0.0 |
| | 2011/8/2 | 10:00 | 22.60 | 47 | 402 | 8 | 2.9 | 003 | 2.16 | 10 | 0.0 | 0.0 |
| | 2011/8/2 | 11:00 | 22.70 | 40 | 399 | 9 | 4.5 | 003 | 2.46 | 10 | 0.0 | 0.0 |
| | 2011/8/2 | 12:00 | 23.10 | 40 | 396 | 8 | 4.8 | 003 | 2.53 | 10 | 0.0 | 0.0 |
| | 2011/8/2 | 13:00 | 22.10 | 50 | 395 | 7 | 6.6 | 003 | 2.48 | 10 | 0.0 | 0.0 |
| | 2011/8/2 | 14:00 | 22.30 | 49 | 395 | 8 | 5.2 | 003 | 2.19 | 10 | 0.0 | 0.0 |
| | 2011/8/2 | 15:00 | 22.50 | 46 | 395 | 8 | 5.4 | 003 | 2.19 | 10 | 0.0 | 0.0 |
| | 2011/8/2 | 16:00 | 22.30 | 42 | 394 | 8 | 3.3 | 003 | 1.73 | 10 | 0.0 | 0.0 |
| | 2011/8/2 | 17:00 | 21.80 | 46 | 395 | 7 | 4.8 | 003 | 0.68 | 9 | 0.0 | 0.0 |
| | 2011/8/2 | 18:00 | 21.00 | 46 | 400 | 8 | 6.8 | 003 | 0.25 | 9 | 0.0 | 0.0 |
| | 2011/8/2 | 19:00 | 20.20 | 55 | 407 | 8 | 5 | 003 | 0.02 | 9 | 0.0 | 0.0 |
| | 2011/8/2 | 20:00 | 20.00 | 58 | 408 | 8 | 3.1 | 003 | 0.00 | 9 | 0.0 | 0.0 |
| | 2011/8/2 | 21:00 | 19.60 | 63 | 410 | 8 | 3.8 | 003 | 0.00 | 9 | 0.0 | 0.0 |
| | 2011/8/2 | 22:00 | 19.60 | 63 | 412 | 8 | 3.3 | 003 | 0.00 | 9 | 0.0 | 0.0 |
| | 2011/8/2 | 23:00 | 19.30 | 65 | 413 | 8 | 2.6 | 003 | 0.00 | 9 | 0.0 | 0.0 |

FIG.13

| CUSTOMER ID | POSITIONAL INFORMATION | TYPE | WEATHER FORECAST ID |
|---|---|---|---|
| 9910035 | 990021 | FORECAST | e4089910 |

D11

D12

| DATE | TIME | WEATHER FORECAST VALUE | | | | | | | | | |
|---|---|---|---|---|---|---|---|---|---|---|---|
| | | TEMPERATURE | HUMIDITY | $CO_2$ CONCENTRATION | WIND DIRECTION | WIND VELOCITY | WEATHER | AMOUNT OF SOLAR RADIATION | AMOUNT OF CLOUD | AMOUNT OF PRECIPITATION | AMOUNT OF SNOWFALL |
| 2011/8/1 | 18:00 | 21.00 | 46 | 400 | 8 | 6.8 | 003 | 0.25 | 9 | 0.0 | 0.0 |
| 2011/8/1 | 19:00 | 20.20 | 55 | 407 | 8 | 5 | 003 | 0.02 | 9 | 0.0 | 0.0 |
| 2011/8/1 | 20:00 | 20.00 | 58 | 408 | 8 | 3.1 | 003 | 0.00 | 9 | 0.0 | 0.0 |
| 2011/8/1 | 21:00 | 19.60 | 63 | 410 | 8 | 3.8 | 003 | 0.00 | 9 | 0.0 | 0.0 |
| 2011/8/1 | 22:00 | 19.60 | 63 | 412 | 8 | 3.3 | 003 | 0.00 | 9 | 0.0 | 0.0 |
| 2011/8/1 | 23:00 | 19.30 | 65 | 413 | 8 | 2.6 | 003 | 0.00 | 9 | 0.0 | 0.0 |
| 2011/8/2 | 0:00 | 19.00 | 67 | 413 | 7 | 2.4 | 003 | 0.00 | 9 | 0.0 | 0.0 |
| 2011/8/2 | 1:00 | 18.60 | 60 | 412 | 9 | 4.7 | 003 | 0.00 | 9 | 0.0 | 0.0 |
| 2011/8/2 | 2:00 | 18.50 | 62 | 411 | 10 | 4.4 | 003 | 0.00 | 9 | 0.0 | 0.0 |
| 2011/8/2 | 3:00 | 18.40 | 61 | 409 | 9 | 5.4 | 003 | 0.00 | 9 | 0.0 | 0.0 |
| 2011/8/2 | 4:00 | 18.40 | 60 | 408 | 9 | 4.5 | 003 | 0.00 | 9 | 0.0 | 0.0 |
| 2011/8/2 | 5:00 | 18.30 | 61 | 408 | 9 | 5.6 | 003 | 0.00 | 10 | 0.0 | 0.0 |
| 2011/8/2 | 6:00 | 18.40 | 62 | 410 | 10 | 3.8 | 003 | 0.19 | 10 | 0.0 | 0.0 |
| 2011/8/2 | 7:00 | 19.10 | 60 | 414 | 9 | 4.4 | 003 | 0.60 | 10 | 0.0 | 0.0 |
| 2011/8/2 | 8:00 | 20.00 | 55 | 414 | 9 | 3.9 | 003 | 1.12 | 10 | 0.0 | 0.0 |
| 2011/8/2 | 9:00 | 21.30 | 51 | 407 | 10 | 3.9 | 003 | 1.59 | 10 | 0.0 | 0.0 |
| 2011/8/2 | 10:00 | 22.60 | 47 | 402 | 8 | 2.9 | 003 | 2.16 | 10 | 0.0 | 0.0 |
| 2011/8/2 | 11:00 | 22.70 | 40 | 399 | 9 | 4.5 | 003 | 2.46 | 10 | 0.0 | 0.0 |
| 2011/8/2 | 12:00 | 23.10 | 40 | 396 | 8 | 4.8 | 003 | 2.53 | 10 | 0.0 | 0.0 |
| 2011/8/2 | 13:00 | 22.10 | 50 | 395 | 7 | 6.6 | 003 | 2.48 | 10 | 0.0 | 0.0 |
| 2011/8/2 | 14:00 | 22.30 | 49 | 395 | 8 | 5.2 | 003 | 2.19 | 10 | 0.0 | 0.0 |
| 2011/8/2 | 15:00 | 22.50 | 46 | 395 | 8 | 5.4 | 003 | 2.19 | 10 | 0.0 | 0.0 |
| 2011/8/2 | 16:00 | 22.30 | 42 | 394 | 8 | 3.3 | 003 | 1.73 | 10 | 0.0 | 0.0 |
| 2011/8/2 | 17:00 | 21.80 | 46 | 395 | 7 | 4.8 | 003 | 0.68 | 9 | 0.0 | 0.0 |
| 2011/8/2 | 18:00 | 21.00 | 46 | 400 | 8 | 6.8 | 003 | 0.25 | 9 | 0.0 | 0.0 |
| 2011/8/2 | 19:00 | 20.20 | 55 | 407 | 8 | 5 | 003 | 0.02 | 9 | 0.0 | 0.0 |
| 2011/8/2 | 20:00 | 20.00 | 58 | 408 | 8 | 3.1 | 003 | 0.00 | 9 | 0.0 | 0.0 |
| 2011/8/2 | 21:00 | 19.60 | 63 | 410 | 8 | 3.8 | 003 | 0.00 | 9 | 0.0 | 0.0 |
| 2011/8/2 | 22:00 | 19.60 | 63 | 412 | 8 | 3.3 | 003 | 0.00 | 9 | 0.0 | 0.0 |
| 2011/8/2 | 23:00 | 19.30 | 65 | 413 | 8 | 2.6 | 003 | 0.00 | 9 | 0.0 | 0.0 |

FIG.14

| CUS-TOMER ID | POSI-TIONAL INFOR-MATION | TYPE | WEATHER FORECAST ID |
|---|---|---|---|
| 9910035 | 990021 | UPPER LIMIT | e4089911 |

D11

| DATE | TIME | WEATHER FORECAST VALUE | | | | | | | | | |
|---|---|---|---|---|---|---|---|---|---|---|---|
| | | TEMPER-ATURE | HUMIDITY | $CO_2$ CONCEN-TRATION | WIND DIRECTION | WIND VELOCITY | WEATHER | AMOUNT OF SOLAR RADIATION | AMOUNT OF CLOUD | AMOUNT OF PRECIPI-TATION | AMOUNT OF SNOWFALL |
| 2011/8/1 | 18:00 | 21.00 | 59 | 401 | 8 | 7.8 | 002 | 0.02 | 11 | 0.0 | 0.0 |
| 2011/8/1 | 19:00 | 20.20 | 58 | 415 | 8 | 7 | 003 | 0.02 | 12 | 0.0 | 0.0 |
| 2011/8/1 | 20:00 | 20.00 | 66 | 423 | 8 | 5.1 | 003 | 0.00 | 10 | 0.0 | 0.0 |
| 2011/8/1 | 21:00 | 19.60 | 71 | 414 | 8 | 5.8 | 003 | 0.00 | 10 | 0.0 | 0.0 |
| 2011/8/1 | 22:00 | 19.60 | 72 | 423 | 8 | 4.3 | 003 | 0.00 | 10 | 0.0 | 0.0 |
| 2011/8/1 | 23:00 | 19.30 | 73 | 416 | 8 | 4.6 | 003 | 0.00 | 11 | 0.0 | 0.0 |
| 2011/8/2 | 0:00 | 19.00 | 86 | 414 | 7 | 4.4 | 003 | 0.00 | 10 | 0.0 | 0.0 |
| 2011/8/2 | 1:00 | 18.60 | 77 | 418 | 9 | 6.7 | 003 | 0.00 | 10 | 0.0 | 0.0 |
| 2011/8/2 | 2:00 | 18.50 | 73 | 431 | 10 | 6.4 | 003 | 0.00 | 12 | 0.0 | 0.0 |
| 2011/8/2 | 3:00 | 18.40 | 76 | 416 | 9 | 7.4 | 003 | 0.00 | 10 | 0.0 | 0.0 |
| 2011/8/2 | 4:00 | 18.40 | 76 | 418 | 9 | 6.5 | 003 | 0.00 | 11 | 0.0 | 0.0 |
| 2011/8/2 | 5:00 | 18.30 | 63 | 419 | 9 | 7.6 | 003 | 0.00 | 11 | 0.0 | 0.0 |
| 2011/8/2 | 6:00 | 18.40 | 71 | 427 | 10 | 5.8 | 003 | 0.19 | 13 | 0.0 | 0.0 |
| 2011/8/2 | 7:00 | 19.10 | 67 | 422 | 9 | 6.4 | 003 | 0.60 | 11 | 0.0 | 0.0 |
| 2011/8/2 | 8:00 | 20.00 | 57 | 433 | 9 | 4.9 | 003 | 1.12 | 13 | 0.0 | 0.0 |
| 2011/8/2 | 9:00 | 21.30 | 65 | 419 | 10 | 4.9 | 003 | 1.59 | 11 | 0.0 | 0.0 |
| 2011/8/2 | 10:00 | 22.60 | 66 | 415 | 8 | 3.9 | 003 | 2.16 | 13 | 0.0 | 0.0 |
| 2011/8/2 | 11:00 | 22.70 | 41 | 401 | 9 | 6.5 | 003 | 2.46 | 13 | 0.0 | 0.0 |
| 2011/8/2 | 12:00 | 23.10 | 47 | 401 | 8 | 5.8 | 003 | 2.53 | 11 | 0.0 | 0.0 |
| 2011/8/2 | 13:00 | 22.10 | 54 | 408 | 7 | 8.6 | 003 | 2.48 | 13 | 0.0 | 0.0 |
| 2011/8/2 | 14:00 | 22.30 | 53 | 404 | 8 | 7.2 | 003 | 2.19 | 12 | 0.0 | 0.0 |
| 2011/8/2 | 15:00 | 22.50 | 49 | 406 | 8 | 7.4 | 003 | 2.19 | 12 | 0.0 | 0.0 |
| 2011/8/2 | 16:00 | 22.30 | 60 | 409 | 8 | 4.3 | 003 | 1.73 | 13 | 0.0 | 0.0 |
| 2011/8/2 | 17:00 | 21.80 | 65 | 414 | 7 | 5.8 | 003 | 0.68 | 10 | 0.0 | 0.0 |
| 2011/8/2 | 18:00 | 21.00 | 50 | 416 | 8 | 8.8 | 003 | 0.25 | 12 | 0.0 | 0.0 |
| 2011/8/2 | 19:00 | 20.20 | 63 | 411 | 8 | 6 | 003 | 0.02 | 12 | 0.0 | 0.0 |
| 2011/8/2 | 20:00 | 20.00 | 64 | 414 | 8 | 4.1 | 003 | 0.00 | 10 | 0.0 | 0.0 |
| 2011/8/2 | 21:00 | 19.60 | 81 | 426 | 8 | 5.8 | 003 | 0.00 | 11 | 0.0 | 0.0 |
| 2011/8/2 | 22:00 | 19.60 | 83 | 413 | 8 | 4.3 | 003 | 0.00 | 11 | 0.0 | 0.0 |
| 2011/8/2 | 23:00 | 19.30 | 73 | 429 | 8 | 4.6 | 003 | 0.00 | 10 | 0.0 | 0.0 |

| CUSTOMER ID | POSITIONAL INFOR-MATION | WEATHER FORECAST ID |
|---|---|---|
| 9910035 | 990021 | e4089910 |

D22

| DATE | TIME | POWER CON-SUMPTION | REDUCIBLE POWER AMOUNT |
|---|---|---|---|
| 2011/8/1 | 18:00 | 460 | 50.6 |
| 2011/8/1 | 19:00 | 550 | 60.5 |
| 2011/8/1 | 20:00 | 580 | 75.4 |
| 2011/8/1 | 21:00 | 630 | 44.1 |
| 2011/8/1 | 22:00 | 630 | 6.3 |
| 2011/8/1 | 23:00 | 650 | 6.5 |
| 2011/8/2 | 0:00 | 670 | 0.0 |
| 2011/8/2 | 1:00 | 600 | 24.0 |
| 2011/8/2 | 2:00 | 620 | 74.4 |
| 2011/8/2 | 3:00 | 610 | 6.1 |
| 2011/8/2 | 4:00 | 600 | 60.0 |
| 2011/8/2 | 5:00 | 610 | 48.8 |
| 2011/8/2 | 6:00 | 620 | 18.6 |
| 2011/8/2 | 7:00 | 600 | 42.0 |
| 2011/8/2 | 8:00 | 550 | 71.5 |
| 2011/8/2 | 9:00 | 510 | 45.9 |
| 2011/8/2 | 10:00 | 470 | 14.1 |
| 2011/8/2 | 11:00 | 400 | 24.0 |
| 2011/8/2 | 12:00 | 400 | 40.0 |
| 2011/8/2 | 13:00 | 500 | 0.0 |
| 2011/8/2 | 14:00 | 490 | 53.9 |
| 2011/8/2 | 15:00 | 460 | 64.4 |
| 2011/8/2 | 16:00 | 420 | 21.0 |
| 2011/8/2 | 17:00 | 460 | 46.0 |
| 2011/8/2 | 18:00 | 460 | 13.8 |
| 2011/8/2 | 19:00 | 550 | 60.5 |
| 2011/8/2 | 20:00 | 580 | 5.8 |
| 2011/8/2 | 21:00 | 630 | 81.9 |
| 2011/8/2 | 22:00 | 630 | 88.2 |
| 2011/8/2 | 23:00 | 650 | 45.5 |

| CUS-TOMER ID | POSITIONAL INFORMATION | TYPE | ACTUAL ID | WEATHER FORECAST ID |
|---|---|---|---|---|
| 9910035 | 990021 | ACTUAL | e4089912 | e4089910 |

D32

| DATE | TIME | WEATHER FORECAST VALUE | | | | | | | | | |
|---|---|---|---|---|---|---|---|---|---|---|---|
| | | TEMPERATURE | HUMIDITY | $CO_2$ CONCENTRATION | WIND DIRECTION | WIND VELOCITY | WEATHER | AMOUNT OF SOLAR RADIATION | AMOUNT OF CLOUD | AMOUNT OF PRECIPITATION | AMOUNT OF SNOWFALL |
| 2011/8/1 | 18:00 | 21.00 | 46 | 400 | 8 | 6.8 | 003 | 0.25 | 9 | 0.0 | 0.0 |
| 2011/8/1 | 19:00 | 20.20 | 55 | 407 | 8 | 5 | 003 | 0.02 | 9 | 0.0 | 0.0 |
| 2011/8/1 | 20:00 | 20.00 | 58 | 408 | 8 | 3.1 | 003 | 0.00 | 9 | 0.0 | 0.0 |
| 2011/8/1 | 21:00 | 19.60 | 63 | 410 | 8 | 3.8 | 003 | 0.00 | 9 | 0.0 | 0.0 |
| 2011/8/1 | 22:00 | 19.60 | 63 | 412 | 8 | 3.3 | 003 | 0.00 | 9 | 0.0 | 0.0 |
| 2011/8/1 | 23:00 | 19.30 | 65 | 413 | 8 | 2.6 | 003 | 0.00 | 9 | 0.0 | 0.0 |
| 2011/8/2 | 0:00 | 19.00 | 67 | 413 | 7 | 2.4 | 003 | 0.00 | 9 | 0.0 | 0.0 |
| 2011/8/2 | 1:00 | 18.60 | 60 | 412 | 9 | 4.7 | 003 | 0.00 | 9 | 0.0 | 0.0 |
| 2011/8/2 | 2:00 | 18.50 | 62 | 411 | 10 | 4.4 | 003 | 0.00 | 9 | 0.0 | 0.0 |
| 2011/8/2 | 3:00 | 18.40 | 61 | 409 | 9 | 5.4 | 003 | 0.00 | 9 | 0.0 | 0.0 |
| 2011/8/2 | 4:00 | 18.40 | 60 | 408 | 9 | 4.5 | 003 | 0.00 | 9 | 0.0 | 0.0 |
| 2011/8/2 | 5:00 | 18.30 | 61 | 408 | 9 | 5.6 | 003 | 0.00 | 10 | 0.0 | 0.0 |
| 2011/8/2 | 6:00 | 18.40 | 62 | 410 | 10 | 3.8 | 003 | 0.19 | 10 | 0.0 | 0.0 |
| 2011/8/2 | 7:00 | 19.10 | 60 | 414 | 9 | 4.4 | 003 | 0.60 | 10 | 0.0 | 0.0 |
| 2011/8/2 | 8:00 | 20.00 | 55 | 414 | 9 | 3.9 | 003 | 1.12 | 10 | 0.0 | 0.0 |
| 2011/8/2 | 9:00 | 21.30 | 51 | 407 | 10 | 3.9 | 003 | 1.59 | 10 | 0.0 | 0.0 |
| 2011/8/2 | 10:00 | 22.60 | 47 | 402 | 8 | 2.9 | 003 | 2.16 | 10 | 0.0 | 0.0 |
| 2011/8/2 | 11:00 | 22.70 | 40 | 399 | 9 | 4.5 | 003 | 2.46 | 10 | 0.0 | 0.0 |
| 2011/8/2 | 12:00 | 23.10 | 40 | 396 | 8 | 4.8 | 003 | 2.53 | 10 | 0.0 | 0.0 |
| 2011/8/2 | 13:00 | 22.10 | 50 | 395 | 7 | 6.6 | 003 | 2.48 | 10 | 0.0 | 0.0 |
| 2011/8/2 | 14:00 | 22.30 | 49 | 395 | 8 | 5.2 | 003 | 2.19 | 10 | 0.0 | 0.0 |
| 2011/8/2 | 15:00 | 22.50 | 46 | 395 | 8 | 5.4 | 003 | 2.19 | 10 | 0.0 | 0.0 |
| 2011/8/2 | 16:00 | 22.30 | 42 | 394 | 8 | 3.3 | 003 | 1.73 | 10 | 0.0 | 0.0 |
| 2011/8/2 | 17:00 | 21.80 | 46 | 395 | 7 | 4.8 | 003 | 0.68 | 9 | 0.0 | 0.0 |
| 2011/8/2 | 18:00 | 21.00 | 46 | 400 | 8 | 6.8 | 003 | 0.25 | 9 | 0.0 | 0.0 |
| 2011/8/2 | 19:00 | 20.20 | 55 | 407 | 8 | 5 | 003 | 0.02 | 9 | 0.0 | 0.0 |
| 2011/8/2 | 20:00 | 20.00 | 58 | 408 | 8 | 3.1 | 003 | 0.00 | 9 | 0.0 | 0.0 |
| 2011/8/2 | 21:00 | 19.60 | 63 | 410 | 8 | 3.8 | 003 | 0.00 | 9 | 0.0 | 0.0 |
| 2011/8/2 | 22:00 | 19.60 | 63 | 412 | 8 | 3.3 | 003 | 0.00 | 9 | 0.0 | 0.0 |
| 2011/8/2 | 23:00 | 19.30 | 65 | 413 | 8 | 2.6 | 003 | 0.00 | 9 | 0.0 | 0.0 |

POWER MANAGEMENT SYSTEM AND POWER MANAGEMENT METHOD

CROSS-REFERENCE TO RELATED APPLICATIONS

This application is national stage application of International Application No. PCT/JP2012/065526, Filed Jun. 18, 2012, which designates the United States, incorporated herein by reference, and which claims the benefit of priority from Japanese Patent Application No. 2011-289493, filed on Dec. 28, 2011, the entire contents of which are incorporated herein by reference.

FIELD

Embodiments described herein relate generally to a power management system and a power management method.

BACKGROUND

In recent years, action to reduce greenhouse gases has been promoted in civilian sectors besides in industrial sectors, and structures in which energy is consumed, such as buildings and factories, are required to further conserve energy. However, it is assumed that power consumption inevitably increases in developing countries along with economic development and that power consumption also increases even in developed countries along with the popularization of electric vehicles and the like.

In terms of power supply, power systems have characteristics in that stable operation fails to be achieved unless the amount of power consumption (demand) and the amount of power generation (supply) are constantly balanced. In other words, the balance of supply and demand needs to be constantly maintained. Therefore, it is required to reinforce power generation facilities in accordance with a peak of power consumption and to secure larger supply and demand adjustment reserve capacity.

Securement of demand response capability is expected as an aspect of the supply and demand adjustment reserve capacity. Demand response means reducing power demand instead of increasing power generation to balance supply and demand. By securing capability to reduce power consumption when needed (demand response capability), the capability can contribute to stable operation of power systems as power generation reserve capacity. Furthermore, by managing and integrating reducible power amounts in power consumption of individual customers in units of areas or the like, the demand response capability increases.

Conventionally, there has been developed a technology for predicting power consumption of customers in units of areas to supply target power obtained by subtracting reduction of a fixed ratio as a technology for securing the demand response capability. Examples of the technology for predicting power consumption of customers include a technology for predicting power consumption based on temperature and humidity in the early morning and forecast maximum temperature and a technology for predicting power consumption based on weather information, such as outside air temperature, humidity, and an amount of solar radiation of the following day.

However, because the conventional technology for securing the demand response capability described above fails to reflect an operating plan or the like of each customer closely, target power supplied to customers may possibly be difficult to realize. As a result, the conventional technology problematically fails to provide accuracy expected for reduction in power consumption. Furthermore, in the conventional technology for predicting power consumption described above, accuracy of power consumption depends on accuracy of the weather information (weather forecast). As a result, the conventional technology may possibly fail to provide accuracy expected for forecast of power consumption depending on the weather information to be used.

BRIEF DESCRIPTION OF DRAWINGS

FIG. 12 is a schematic of an example of the wide-area weather forecast information;

FIG. 13 is a schematic of an example of weather forecast information to which no change range is added according to the embodiment;

FIG. 14 is a schematic of an example of the weather forecast information to which the change range is added according to the embodiment;

FIG. 16 is schematic of an example of power prediction information generated by the power predictive value calculation processing illustrated in FIG. 15;

FIG. 19 is a schematic of an example of actual information (actual weather values) according to the embodiment.

DETAILED DESCRIPTION

According to an embodiment, a power management system comprises: customer terminals; and a power management apparatus connected to the customer terminals, wherein each of the customer terminals includes a weather forecast acquisition unit that acquires a local weather forecast for a corresponding customer terminal, and a power prediction unit that predicts a power consumption and an amount of power that can be reduced for a predetermined period based on the weather forecast, and the power management apparatus includes an integration processing unit that integrates the power consumptions and the amounts of power that can be reduced that are predicted for the respective customer terminals to calculate a total power consumption and a total amount of power that can be reduced for all of the customer terminals.

Exemplary embodiments of a power management system and a power management method according to the present invention are described below in greater detail with reference to the accompanying drawings.

Figure 1:
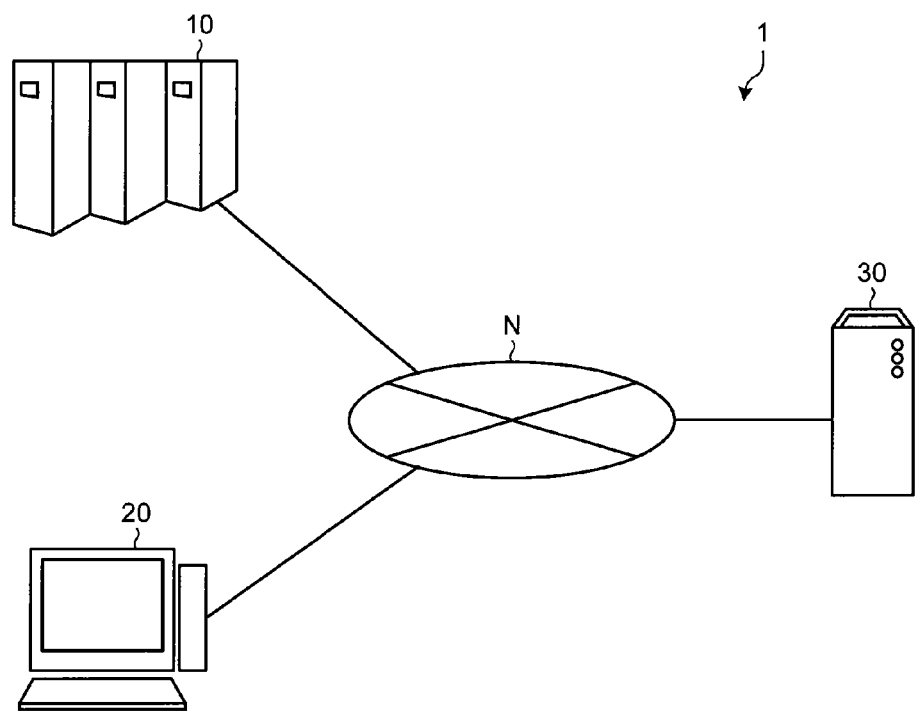
FIG. 1 is a schematic of a configuration of a power management system according to an embodiment.

FIG. 1 is a schematic of a configuration of a power management system according to the present embodiment. As illustrated in the figure, a power management system 1 according to the first embodiment includes a weather information providing apparatus 10, a customer terminal 20, and a power management apparatus 30. The weather information providing apparatus 10, the customer terminal 20, and the power management apparatus 30 are connected to a network N such as the Internet in a detachable manner, and transmit and receive various types of information via the network N. The number of apparatuses connected to the network N is not particularly restricted.

Figure 2:
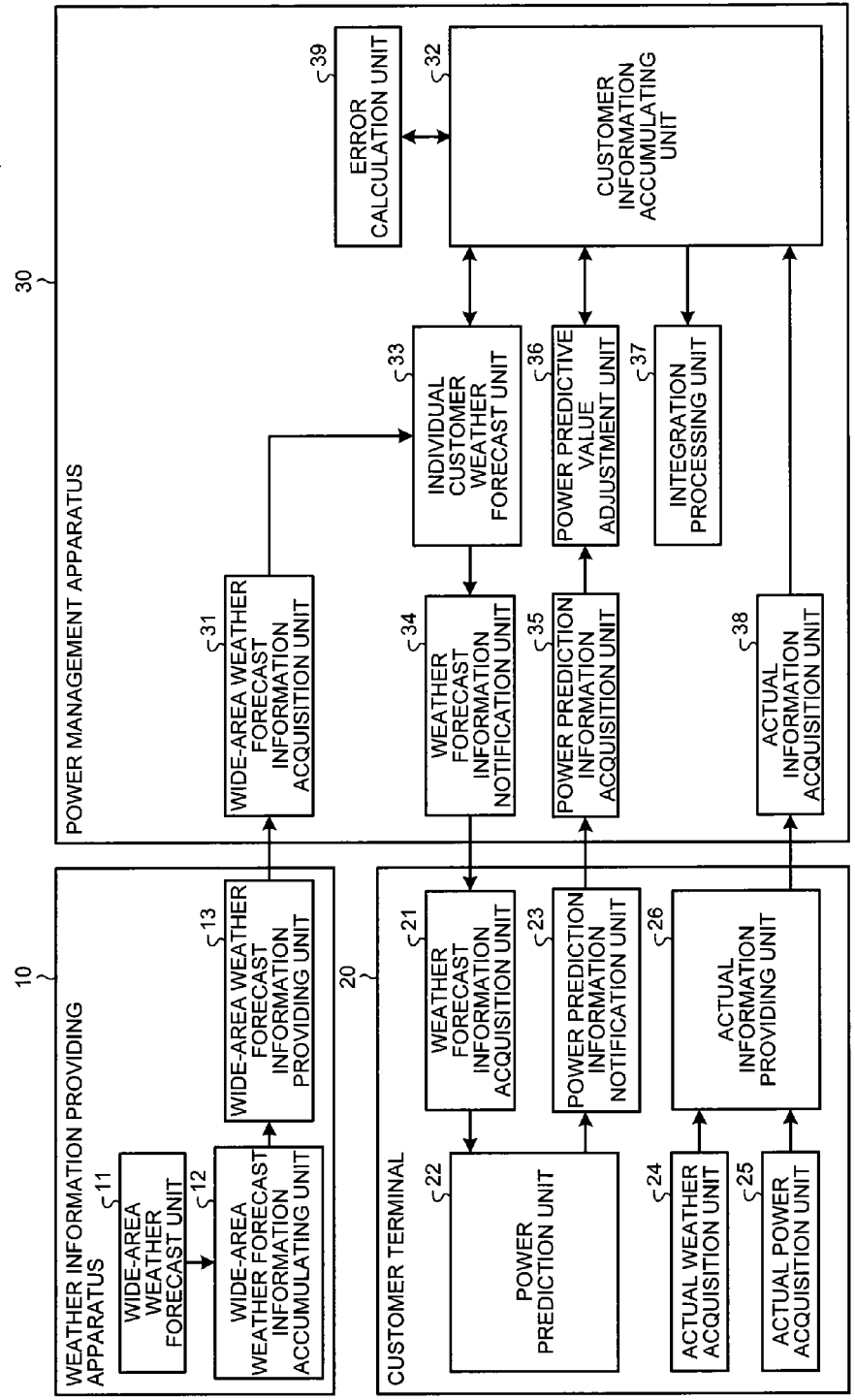
FIG. 2 is a block diagram of an exemplary functional configuration of a weather information providing apparatus, a customer terminal, and a power management apparatus according to the embodiment.

FIG. 2 is a block diagram of an exemplary functional configuration of the power management system 1 (the weather information providing apparatus 10, the customer terminal 20, and the power management apparatus 30).

The weather information providing apparatus 10 is an information processor, such as a server, that performs wide-area weather forecast. The weather information providing apparatus 10 includes a wide-area weather forecast unit 11, a wide-area weather forecast information accumulating unit 12, and a wide-area weather forecast information providing unit 13 as functional units.

The wide-area weather forecast unit 11 predicts weather conditions in a predetermined future period in a wide area including an area managed by the power management apparatus 30, and generates a weather forecast value serving as the forecast result as wide-area weather forecast information. Examples of weather elements to be predicted include temperature (outside air temperature), humidity, $CO_2$ concentration, a wind direction, wind velocity, weather, an amount of solar radiation, an amount of cloud, an amount of precipitation, and an amount of snowfall. In the present embodiment, the forecast of weather conditions is performed in units of fixed periods (e.g., one hour) in the predetermined future period (e.g., one day).

Figure 3:
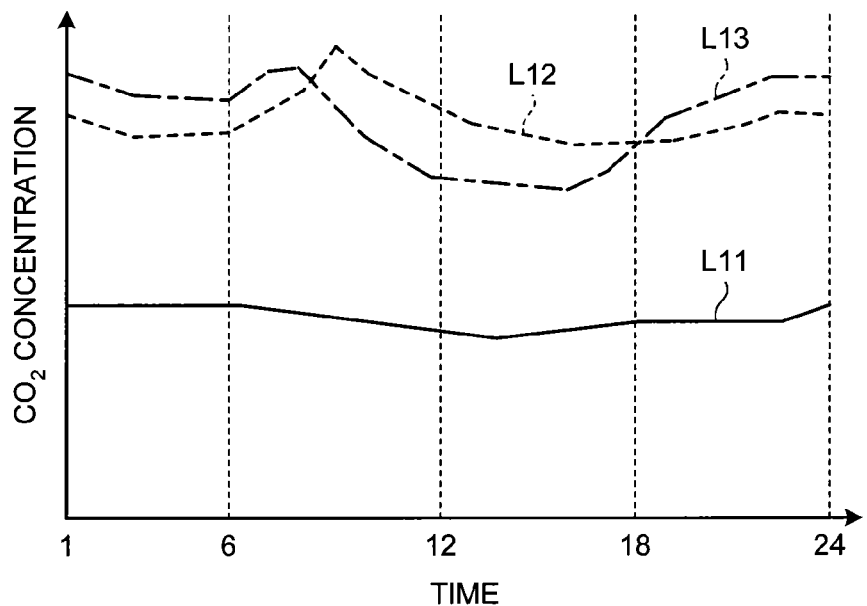
FIG. 3 is a graph schematically illustrating an example of wide-area weather forecast information.
Figure 4:
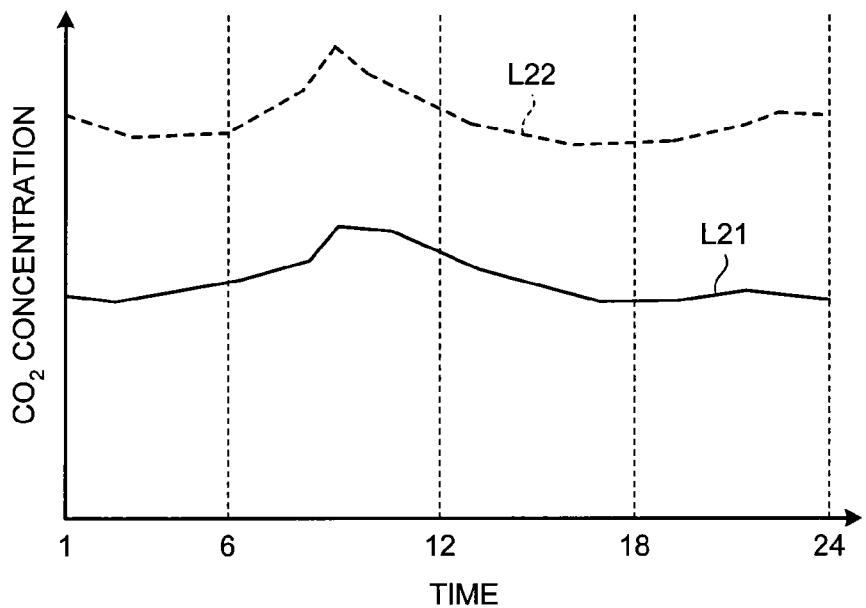
FIG. 4 is another graph schematically illustrating an example of the wide-area weather forecast information.

FIG. 3 and FIG. 4 are graphs schematically illustrating an example of wide-area weather forecast information. FIG. 3 and FIG. 4 illustrate forecast results of $CO_2$ concentration in a certain future day. The vertical axis represents $CO_2$ concentration, and the horizontal axis represents time (from 1 o'clock to 24 o'clock).

The graph of FIG. 3 illustrates forecast results of each area type. In the figure, the area types are a mountainous area, an urban area, and an industrial area. A solid line L11 represents change in $CO_2$ concentration in the mountainous area, a dashed line L12 represents change in $CO_2$ concentration in the urban area, and a dashed-dotted line L13 represents change in $CO_2$ concentration in the industrial area. As illustrated in the figure, the $CO_2$ concentration shows different patterns depending on the area types.

The graph of FIG. 4 illustrates forecast results of each season in the urban area. The seasons herein are two seasons of a summer season and a winter season. A solid line L21 represents change in $CO_2$ concentration in the summer season, and a dashed line L22 represents change in $CO_2$ concentration in the winter season. As illustrated in the figure, the $CO_2$ concentration shows different patterns depending on the seasons.

By simulating weather conditions in the wide area using a well-known numerical forecast model, for example, the wide-area weather forecast unit 11 generates weather conditions at each point (area) such as the area types illustrated in FIG. 3 and weather conditions in accordance with a time period to be a target of forecast (seasons and dates and times) illustrated in FIG. 4 as the wide-area forecast information.

Referring back to FIG. 2, the wide-area weather forecast information accumulating unit 12 is a database, for example, and accumulates therein the wide-area weather forecast information generated by the wide-area weather forecast unit 11. The wide-area weather forecast information providing unit 13 provides (transmits) the wide-area weather forecast information accumulated in the wide-area weather forecast information accumulating unit 12 to the power management apparatus 30 via the network N. The operational timing of providing of the wide-area weather forecast information is not restricted in particular. The wide-area weather forecast information providing unit 13 may provide the wide-area weather forecast information in response to a request from the power management apparatus 30, for example. Alternatively, the wide-area weather forecast information providing unit 13 may transmit the wide-area weather forecast information to the power management apparatus 30 every predetermined time (e.g., every one hour).

The customer terminal 20 is an information processor, such as a personal computer (PC) provided to each customer. The customer terminal 20 includes a weather forecast information acquisition unit 21, a power prediction unit 22, a power prediction information notification unit 23, an actual weather acquisition unit 24, an actual power acquisition unit 25, and an actual information providing unit 26 as functional units.

The weather forecast information acquisition unit 21 acquires (receives) weather forecast information for each customer from the power management apparatus 30 via the network N. The weather forecast information will be described later in detail.

Based on the weather forecast information acquired by the weather forecast information acquisition unit 21, the power prediction unit 22 predicts power consumption and an amount of power that can be reduced (a reducible amount of power) in a customer in the predetermined future period forecasted in the weather forecast information. The operation of the power prediction unit 22 will be described later in detail.

The power prediction information notification unit 23 determines the power consumption and the reducible power amount predicted by the power prediction unit 22 to be power prediction information, and notifies the power management apparatus 30 of (transmits thereto) the power prediction information via the network N. The operational timing of notification of the power prediction information is not restricted in particular. The notification of the power prediction information may be performed in response to a request from the power management apparatus 30, for example. Alternatively, the power prediction information notification unit 23 may notify the power management apparatus 30 of the power prediction information every time the power prediction unit 22 performs forecast.

The actual weather acquisition unit 24 acquires local weather conditions around the customer to which the device itself is provided as actual weather values. Weather elements to be acquired as the actual weather values are coincident with the wide-area weather forecast information (weather forecast information) described above. The method for acquiring the actual weather values is not restricted in particular, and the actual weather acquisition unit 24 may acquire measured values of various types of measuring instruments (e.g., a thermometer, a hygrometer, and an illuminometer) provided to the customer as the actual weather values, for example.

The actual power acquisition unit 25 is a smart meter, for example, and measures power consumption of an electric power load (e.g., an air conditioning load) and power generation of a power generation system (e.g., a photovoltaic and solar thermal power generation system) provided in the customer. Hereinafter, the power consumption and the power generation measured by the actual power acquisition unit 25 are collectively referred to as power consumption.

The actual information providing unit 26 determines the actual weather values acquired by the actual weather acquisition unit 24 and the power consumption acquired by the actual power acquisition unit 25 to be actual information, and provides (transmits) the actual information to the power management apparatus 30 via the network N. The operational timing of transmission of the actual information is not restricted in particular. The actual information providing unit 26 may transmit the actual information in response to a request from the power management apparatus 30, for example. Alternatively, the actual information providing unit 26 may transmit the actual information to the power management apparatus 30 every predetermined time (e.g., every one hour). Furthermore, the actual information providing unit 26 may transmit the actual weather values and the power consumption separately.

The power management apparatus 30 is an information processor, such as a server, that performs power management of a predetermined area. The power management apparatus 30 includes a wide-area weather forecast information acquisition unit 31, a customer information accumulating unit 32, an individual customer weather forecast unit 33, a weather forecast information notification unit 34, a power prediction information acquisition unit 35, a power predictive value adjustment unit 36, an integration processing unit 37, an actual information acquisition unit 38, and an error calculation unit 39 as functional units.

The wide-area weather forecast information acquisition unit 31 acquires wide-area weather forecast information from the weather information providing apparatus 10 (wide-area weather forecast information providing unit 13) via the network N. The operational timing of acquisition of the wide-area weather forecast information is not restricted in particular. The wide-area weather forecast information acquisition unit 31 may request the wide-area weather forecast information from the weather information providing apparatus 10 every predetermined time (e.g., every one hour), for example. Alternatively, the wide-area weather forecast information acquisition unit 31 may wait until the weather information providing apparatus 10 provides the wide-area weather forecast information.

Figure 5:
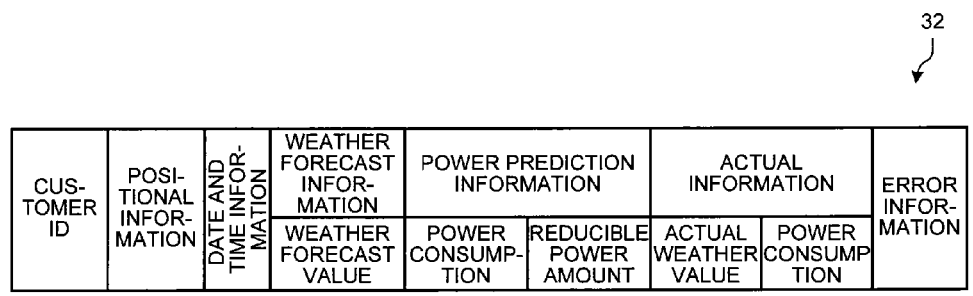
FIG. 5 is a schematic of an exemplary data configuration of a customer information accumulating unit illustrated in FIG. 2.

The customer information accumulating unit 32 is a database, for example, and accumulates therein information on each customer belonging to the area to be managed. FIG. 5 is a schematic of an exemplary data configuration of the customer information accumulating unit 32. As illustrated in the figure, the customer information accumulating unit 32 includes items, such as a customer ID, positional information, date and time information, weather forecast information, power prediction information, actual information, and error information.

The item of the "customer ID" stores therein a unique customer ID allocated to each customer in advance as identification information for identifying each customer. The "positional information" stores therein information by which the present position of each customer can be specified in the area to be managed, such as an address, latitude and longitude, and an area ID indicating a belonging area.

The item of the "date and time information" stores therein information indicating a date and time. The customer information accumulating unit 32 manages weather forecast information, power prediction information, and actual information accumulated in association with the same customer ID (positional information) based on the date and time information. In other words, weather forecast information (weather forecast values) and power prediction information (power consumption and a reducible power amount) predicted for the same date and time and actual information (actual weather values and power consumption) actually measured at the same date and time are accumulated in a manner associated with one another.

The item of the "weather forecast information" stores therein weather forecast information, which will be described later, indicating weather forecast values for each customer calculated by the individual customer weather forecast unit 33. The item of the "power prediction information" stores therein power prediction information (power consumption and a reducible power amount) acquired from the actual power acquisition unit 25 of each customer terminal 20. The item of the "error information" stores therein error information, which will be described later, calculated by the error calculation unit 39.

Referring back to FIG. 2, the individual customer weather forecast unit 33 derives weather forecast information indicating local weather forecast values around each customer based on the wide-area weather forecast information acquired by the wide-area weather forecast information acquisition unit 31 and the positional information of each customer accumulated in the customer information accumulating unit 32.

Specifically, the individual customer weather forecast unit 33 reads weather forecast values at a point (area) corresponding to the positional information of each customer from the wide-area weather forecast information, and interpolates the weather forecast values into weather forecast values at a plurality of points adjacent to the point, thereby calculates reference weather forecast values for each customer. The method for calculating the reference weather forecast values is not limited to the example described above. The individual customer weather forecast unit 33 may calculate the reference weather forecast values for each customer by performing well-known weather simulation based on weather forecast values at each point included in the wide-area weather forecast information and on geographical information indicating geography around each customer.

Furthermore, the individual customer weather forecast unit 33 uses weather conditions, such as weather included in the reference weather forecast values, and information, such as period that is a target of the forecast (e.g., a date and time and a season), as search conditions, and acquires error information, which will be described later, associated with weather forecast information corresponding to the search conditions from the customer information accumulating unit 32 for each customer. The individual customer weather forecast unit 33 then compares the value indicated by the error information thus acquired with a predetermined threshold. If the error information is larger than the threshold, the individual customer weather forecast unit 33 adds a change range in accordance with the error information to reference weather forecast, thereby adjusting the reference weather forecast values. The individual customer weather forecast unit 33 then stores the reference weather forecast values in the customer information accumulating unit 32 as the weather forecast information for each customer.

Figure 6:
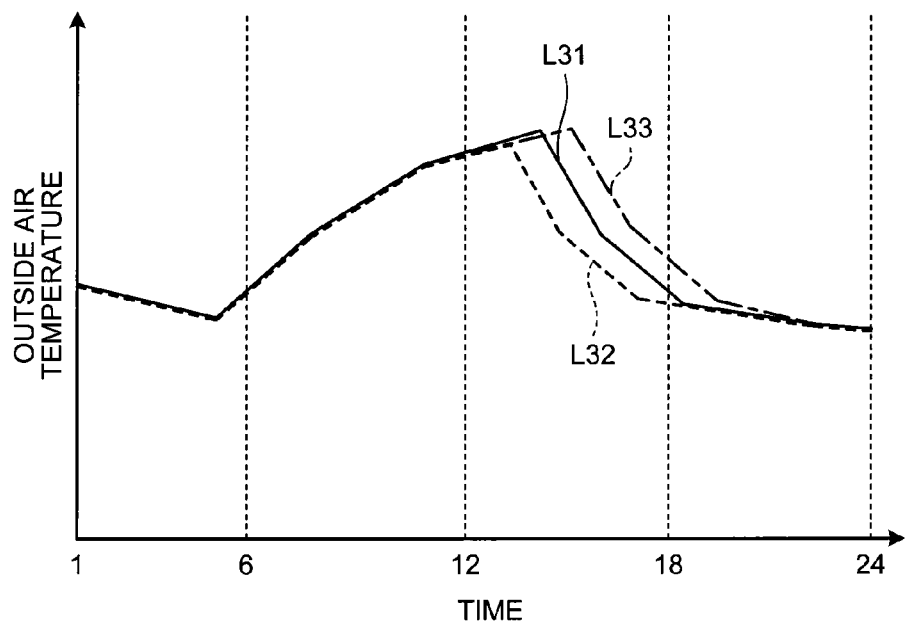
FIG. 6 is a graph for explaining a relationship between reference weather forecast and a change range according to the embodiment.
Figure 7:
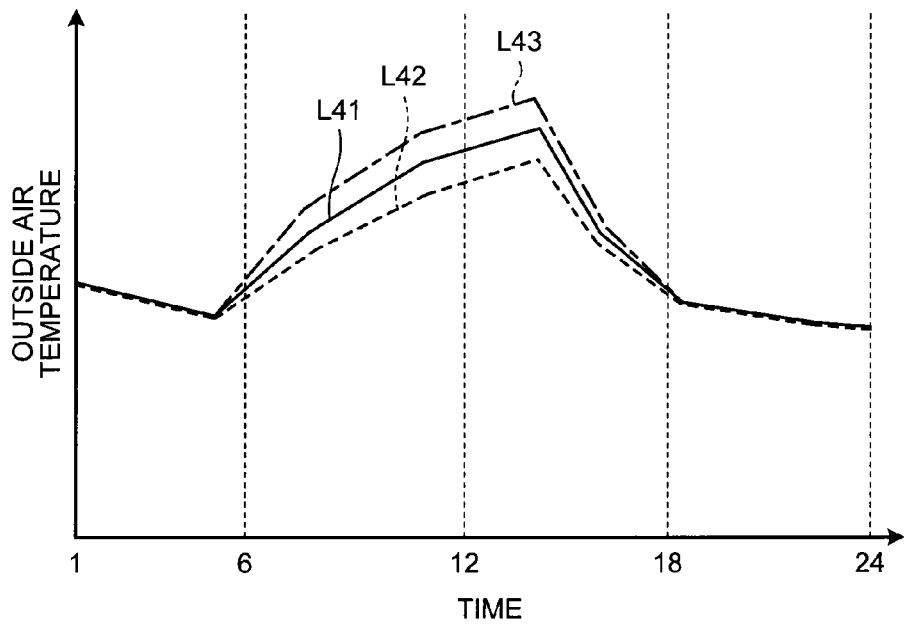
FIG. 7 is another graph for explaining the relationship between the reference weather forecast and the change range according to the embodiment.

FIG. 6 and FIG. 7 are graphs for explaining a relationship between a reference weather forecast value and a change range. The vertical axis represents outside air temperature (temperature), and the horizontal axis represents time that is a target of forecast (from 1 o'clock to 24 o'clock).

In FIG. 6, a solid line L31 represents a reference weather forecast value of the outside air temperature. If a change in the outside air temperature is predicted along with passage of a cold front or a typhoon, for example, by adding a change range to the passage time as illustrated in FIG. 6, it is possible to provide latitude to the time at which the change is expected. A dashed line L32 represents the reference weather forecast value obtained by setting the passage time earlier, whereas a dashed-dotted line L33 represents the reference weather forecast value obtained by setting the passage time later.

In the case of FIG. 6, the individual customer weather forecast unit 33 extracts a change tendency in the time direction for each customer from the error information indicating an error of the weather forecast accumulated in the customer information accumulating unit 32, and adds a change range in accordance with the change tendency to the reference weather forecast value. Thus, the individual customer weather forecast unit 33 generates one of the dashed line L32 and the dashed-dotted line L33 obtained by adding a change amount to the solid line L31 as weather forecast information, for example.

In FIG. 7, a solid line L41 represents the reference weather forecast value of the outside air temperature. If change in the outside air temperature is predicted because of influence of the wind direction and the amount of cloud, for example, by adding a change range to the outside air temperature as illustrated in FIG. 7, it is possible to provide latitude to the temperature to be predicted. A dashed line L42 represents the reference weather forecast value obtained by setting the outside air temperature lower, whereas a dashed-dotted line L43 represents the reference weather forecast value obtained by setting the outside air temperature higher.

In the case of FIG. 7, the individual customer weather forecast unit 33 extracts a change tendency in the outside air temperature for each customer from the error information accumulated in the customer information accumulating unit 32, and adds a change range in accordance with the change tendency to the reference weather forecast value. Thus, the individual customer weather forecast unit 33 generates one of the dashed line L42 and the dashed-dotted line L43 obtained by adding a change amount to the solid line L41 as weather forecast information, for example. At this time, the change range can be added in each fixed period unit (unit of one hour in the case of FIG. 6 and FIG. 7) obtained by fractionizing the forecast period. Furthermore, the method for adding the change amount (e.g., the forward and backward directions in time and the increasing and decreasing directions in the temperature) is preferably unified for each customer.

As described above, various methods can be employed to add the change range to the reference weather forecast. In the present embodiment, by extracting a change tendency in weather conditions from error information between previous weather forecast and actual weather for each customer, and adding a change amount in accordance with the tendency to the reference weather forecast, weather forecast information customized for each customer is generated. The fact that the change amount has been already added, the magnitude of the change amount, and information indicating the method for adding the change range, for example, are attached to the weather forecast information to which the change amount is added (refer to FIG. 13 and FIG. 14).

Referring back to FIG. 2, the weather forecast information notification unit 34 notifies the customer terminal 20 (weather forecast information acquisition unit 21) of a corresponding customer of (transmits thereto) the weather forecast information for each customer generated by the individual customer weather forecast unit 33 via the network N. The operational timing of notification is not restricted in particular, and the notification may be performed every time the individual customer weather forecast unit 33 generates weather forecast information.

The weather forecast information reported from the weather forecast information notification unit 34 is acquired (received) by the weather forecast information acquisition unit 21 of the corresponding customer (customer terminal 20), and is transferred to the power prediction unit 22.

The power prediction unit 22 of the customer terminal 20 calculates (predicts) an energy load required in the predetermined future period that is a target of the forecast in the weather forecast information by using the weather forecast information acquired from the power management apparatus 30 and information on an electric power load input by the customer in advance. Specifically, the power prediction unit 22 adjusts parameters related to calculation of the energy load in accordance with the weather forecast value of each of the weather elements included in the weather forecast information, and uses the parameters thus adjusted to calculate the energy load.

The weather element of the "temperature" influences an indoor air conditioning load caused by heat exchange through a window and an outer wall, an outside-air conditioning load caused when outside air is processed to be introduced into a room, consumption energy of a heat source system that supplies hot and cold temperature to an air conditioning system, and power generation of a photovoltaic and solar thermal power generation system, for example. The weather element of the "humidity" influences the outside-air conditioning load and the consumption energy of the heat source system, for example. The weather element of the "$CO_2$ concentration" influences the outside-air conditioning load for maintaining an indoor environment. The weather elements of the "wind direction" and the "wind velocity" influence the outside-air conditioning load and power generation of a wind power generation system. The weather element of the "weather" influences all the weather elements as an index indicating change timings and changes in weather forecast. The weather elements of the "amount of solar radiation" and the "amount of cloud" influence the indoor air conditioning load caused by entry of heat from the window, energy consumption of lighting equipment in the room, and the power generation of the photovoltaic and solar thermal power generation system, for example. The weather elements of the "amount of precipitation" and the "amount of snowfall" influence the power generation of the photovoltaic and solar thermal power generation system, for example.

When calculating the energy load, the power prediction unit 22 determines whether a change range is added to the weather forecast information. If a change range is added, the power prediction unit 22 predicts the energy load while taking into account the change range. The method for taking into account the change range is not restricted in particular. A predetermined ratio may be added to or subtracted from the energy load, or the method for calculating the energy load may be changed in accordance with the type of the change range (e.g., the upper limit and the lower limit), for example.

The power prediction unit 22 predicts power consumption and a reducible power amount in the future period forecasted in the weather forecast information from the energy load thus predicted by using information of a customer system. The information of the customer system used herein means an operating plan of each electric power load in a customer, previous forecast results, and the like. The method for predicting the power consumption and the reducible power amount is not restricted in particular, and various methods can be employed, such as a well-known forecast method, a method for calculating the power consumption and the reducible power amount by simulation of a system model, and a method for calculating the power consumption and the reducible power amount from an actual power value by using a neural net and multiple regression analysis.

Figure 8:
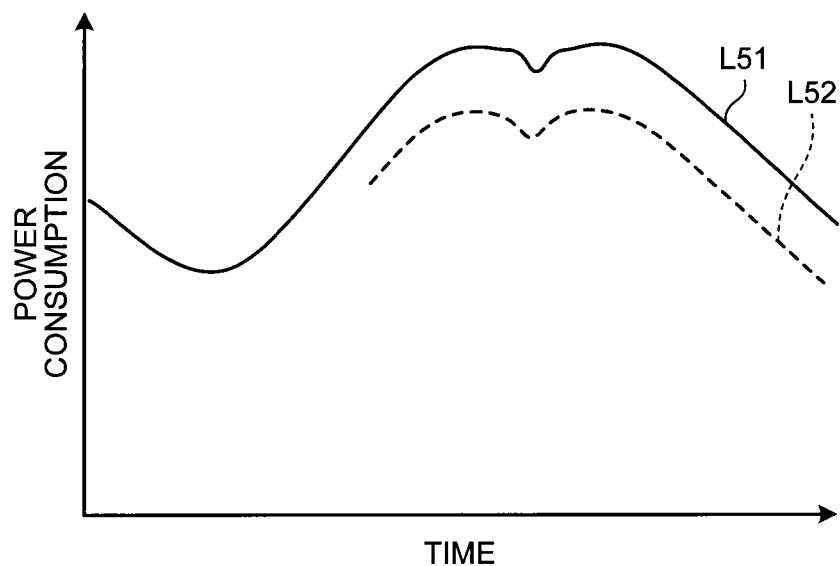
FIG. 8 is a schematic of an example of a relationship between power consumption and a reducible power amount according to the embodiment.

FIG. 8 is a schematic of an example of a relationship between power consumption and a reducible power amount. In FIG. 8, the vertical axis represents power consumption, and the horizontal axis represents time. A solid line L51 represents time transient of the power consumption predicted by the power prediction unit 22, and a dashed line L52 represents time transient of the power consumption when a predetermined amount is reduced from the solid line L51. If reduced from the power consumption biasedly in this manner, the power prediction unit 22 calculates a power amount that is difference between the solid line L51 and the dashed line L52 at each time as a reducible power amount.

Figure 9:
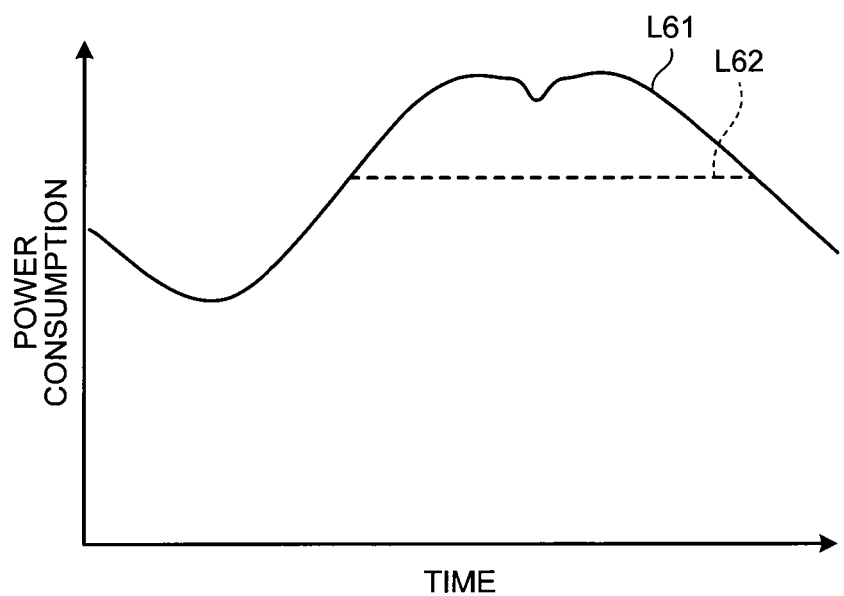
FIG. 9 is a schematic of another example of the relationship between power consumption and a reducible power amount according to the embodiment.

The method for reducing the power consumption is not limited to the example illustrated in FIG. 8. FIG. 9 is a schematic of another example of the relationship between power consumption and a reducible power amount. Similarly to FIG. 8, the vertical axis represents power consumption, and the horizontal axis represents time. In FIG. 9, a solid line L61 represents time transient of the power consumption predicted by the power prediction unit 22, and a dashed line L62 represents time transient of the power consumption when a predetermined amount is reduced from the solid line L61. The power consumption may be reduced such that power consumption at predetermined time is maintained in this manner. The power prediction unit 22 calculates a power amount that is difference between the solid line L61 and the dashed line L62 at each time as a reducible power amount in the same manner as in FIG. 8.

The power prediction information notification unit 23 of the customer terminal 20 notifies the power management apparatus 30 of (transmits thereto) the power consumption and the reducible power amount predicted by the power prediction unit 22 as the power prediction information.

By contrast, the power prediction information acquisition unit 35 of the power management apparatus 30 acquires (receives) the power prediction information from the customer terminal 20 (power prediction information notification unit 23) of each customer via the network N. The operational timing at which the power prediction information acquisition unit 35 acquires the power prediction information is not restricted in particular. The power prediction information acquisition unit 35 may acquire the power prediction information in response to an operation of the power predictive value adjustment unit 36, which will be described later.

The power predictive value adjustment unit 36 adjusts the value of the power prediction information acquired from each customer in accordance with the change range added to the weather forecast information for each customer. Specifically, the power predictive value adjustment unit 36 refers to the weather forecast information for each customer accumulated in the customer information accumulating unit 32, and determines whether a change range is added to the weather forecast information. If a change range is added, the power predictive value adjustment unit 36 adjusts the values of the power consumption and the reducible power amount included in the power prediction information in accordance with the change range to reduce the risk of a weather forecast error caused by the change range.

The method for adjusting the power consumption and the reducible power amount in accordance with the change range is not particularly restricted. If the change range is larger than a predetermined threshold, for example, processing for reducing the power consumption and the reducible power amount at a predetermined rate may be performed. Furthermore, the power predictive value adjustment unit 36 stores the power prediction information thus acquired (the power consumption and the reducible power amount) of each customer in the customer information accumulating unit 32 in a manner associated with the customer ID of the customer corresponding thereto.

The integration processing unit 37 integrates the power consumption and the reducible power amounts, individually, in the predetermined future period included in the customer information of each customer in the customer information accumulating unit 32. Thus, the integration processing unit 37 calculates the total power consumption and the total reducible power amount of all the customers, that is, of the whole area managed by the power management apparatus 30.

The total power consumption and the total reducible power amount calculated by the power management apparatus 30 are used as an amount of power consumption (demand) and supply and demand adjustment reserve capacity, respectively, and a power control apparatus, which is not illustrated, performs power control for the whole area (all the customers). Furthermore, the actual value of power consumption acquired from each customer terminal 20 as actual information can also be used for power control. Based on the predictive value of power consumption presented by each customer and the actual value of power consumption, for example, a configuration for paying compensation in accordance with the degree of the gap therebetween may be incorporated.

The actual information acquisition unit 38 and the error calculation unit 39 are functional units related to calculation of error information. The actual information acquisition unit 38 acquires (receives) actual information (actual weather values and power consumption) from each customer terminal 20 (actual information providing unit 26) via the network N. The operational timing of acquisition of the actual information is not restricted in particular. The actual information acquisition unit 38 may request the actual information from the weather information providing apparatus 10 every predetermined time (e.g., every one hour), for example. Alternatively, the actual information acquisition unit 38 may wait until the weather information providing apparatus 10 provides the actual information. Furthermore, the actual information acquisition unit 38 may acquire the actual weather values and the power consumption separately.

The error calculation unit 39 compares the weather forecast information (weather forecast values) for each customer accumulated in the customer information accumulating unit 32 with the actual information (actual weather values) at the date and time forecasted in the weather forecast information to calculate difference between both the values. Thus, the error calculation unit 39 calculates an error in the actual weather values compared with the weather forecast values as error information. Furthermore, the error calculation unit 39 associates the error information thus calculated with a pair of individual customer weather information and individual customer weather forecast information used for the calculation, and stores the error information in the item of the "error information" in the individual customer information accumulating unit 32. The method for calculating the error between the weather forecast values and the actual weather values is not restricted in particular, and a well-known method is used.

An operation of the power management system 1 with the configuration described above will now be explained. Weather forecast notification processing performed by the power management apparatus 30 will be described with reference to FIG. 10 to FIG. 14.

Figure 10:
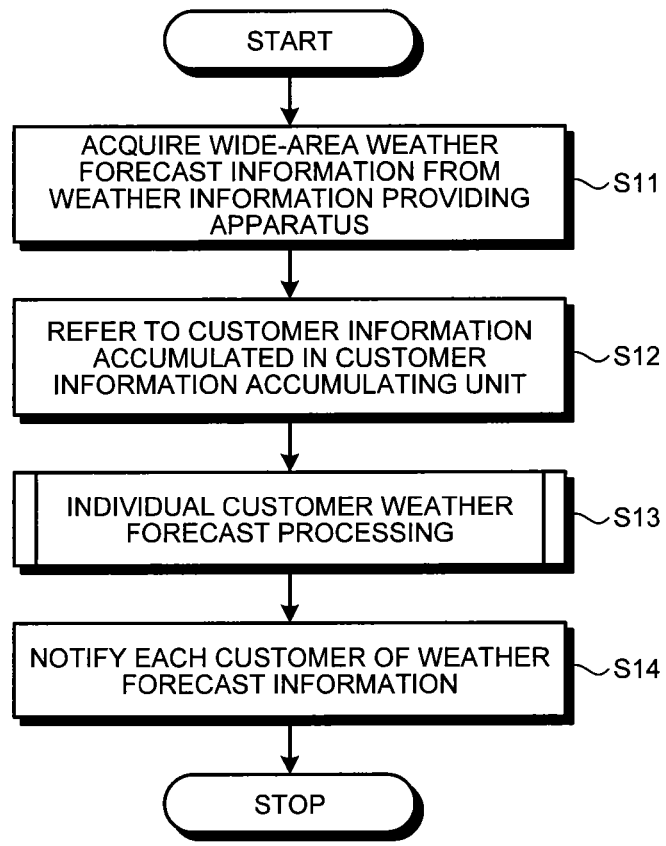
FIG. 10 is a flowchart of an example of weather forecast notification processing performed by the power management apparatus according to the embodiment.

FIG. 10 is a flowchart of an example of the weather forecast notification processing performed by the power management apparatus 30. The wide-area weather forecast information acquisition unit 31 of the power management apparatus 30 requests wide-area weather forecast information from the weather information providing apparatus 10 to acquire wide-area weather forecast information of a wide area including the area to be managed (Step S11). Subsequently, the individual customer weather forecast unit 33 refers to customer information of each customer accumulated in the customer information accumulating unit 32 (Step S12). The individual customer weather forecast unit 33 then performs individual customer weather forecast processing for generating weather forecast information for each customer from the wide-area weather forecast information acquired at Step S11 (Step S13). The individual customer weather forecast processing at Step S13 will now be described with reference to FIG. 11.

Figure 11:
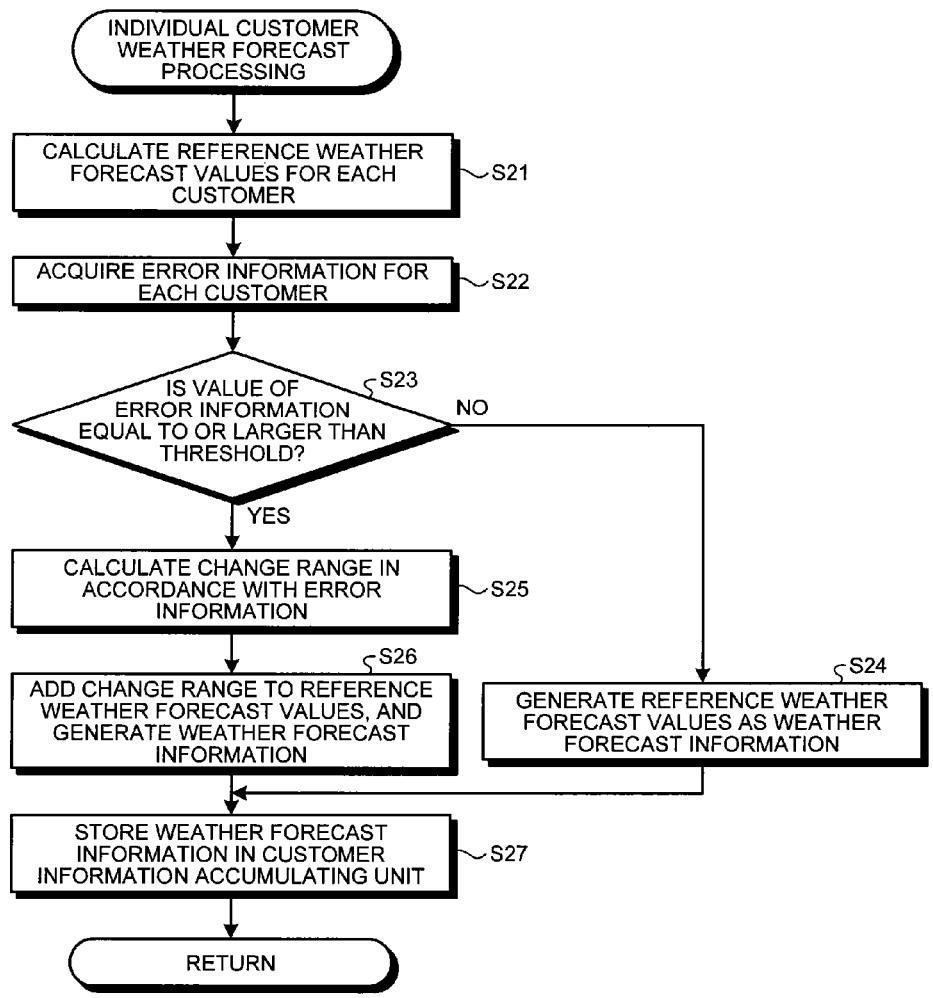
FIG. 11 is a flowchart of an example of individual customer weather forecast processing performed by the power management apparatus according to the embodiment.

FIG. 11 is a flowchart of an example of the individual customer weather forecast processing performed by the power management apparatus 30. The individual customer weather forecast unit 33 calculates reference weather forecast values for each customer based on weather forecast at each point (area) indicated in the weather forecast information and on positional information of each customer (Step S21). Subsequently, the individual customer weather forecast unit 33 uses various types of information related to the reference weather forecast values as search conditions, and acquires error information corresponding to the search conditions for each customer (Step S22).

The individual customer weather forecast unit 33 then compares the value of the error information with a predetermined threshold for each piece of the error information acquired at Step S22, and determines whether the value is larger than the threshold (Step S23). If the value of the error information for a customer is determined to be equal to or smaller than the threshold (No at Step S23), the individual customer weather forecast unit 33 generates the reference weather forecast values calculated at Step S21 as weather forecast information for the corresponding customer (Step S24). The system control then goes to Step S27.

By contrast, if the value of the error information for the customer is determined to be larger than the threshold at Step S23 (Yes at Step S23), the individual customer weather forecast unit 33 calculates a change range in accordance with the value of the error information (Step S25). The individual customer weather forecast unit 33 then adds the change range calculated at Step S25 to the reference weather forecast values for the corresponding customer, thereby generating weather forecast information (Step S26). The system control then goes to Step S27.

Subsequently, at Step S27, the individual customer weather forecast unit 33 stores the weather forecast information for each customer generated at Step S24 or S26 in the customer information accumulating unit 32 in a manner associated with the customer ID of the customer corresponding thereto (Step S27). Subsequently, the system control goes to Step S14 in FIG. 10.

Referring back to FIG. 10, the weather forecast information notification unit 34 notifies the customer terminal 20 of the corresponding customer of the weather forecast information generated by the individual customer weather forecast processing at Step S13 (Step S14), and the present processing is terminated.

An operation of the weather forecast notification processing will now be described. An assumption is made that wide-area weather forecast information illustrated in FIG. 12 is acquired at Step S11, for example. FIG. 12 is a schematic of an example of the wide-area weather forecast information. As illustrated in the figure, for example, the wide-area weather forecast information lists weather forecast values in a predetermined future period for each area type, such as an urban area and a mountainous area, or in predetermined units of an area (an area A1), such as a city, a town, and a village, in units of one hour. Furthermore, in FIG. 12, the weather forecast values include temperature, humidity, $CO_2$ concentration, a wind direction, wind velocity, weather, an amount of solar radiation, an amount of cloud, an amount of precipitation, and an amount of snowfall. In terms of the weather, the state such as clear weather and raining is represented by a numerical value.

In this case, in the individual customer weather forecast processing at Step S13, the individual customer weather forecast unit 33 generates weather forecast information for each customer illustrated in FIG. 13 and FIG. 14 from the wide-area weather forecast information illustrated in FIG. 12, for example. FIG. 13 is a schematic of an example of weather forecast information to which no change range is added. FIG. 14 is a schematic of an example of the weather forecast information to which a change range is added.

As illustrated in FIG. 13 and FIG. 14, the weather forecast information includes additional information D11 and main information D12. The additional information D11 includes a "customer ID", "positional information", a "type", and a "weather forecast ID" as items.

In the additional information D11, a customer ID (9910035) and positional information (990021) of a customer that is a target of the processing are entered in the items of the "customer ID" and the "positional information", respectively, among the customer information of each customer accumulated in the customer information accumulating unit 32. The presence of a change range and the method for adding the change range, for example, are entered in the item of the "type" as type information indicating the type of the weather forecast information. The type information of "forecast" entered in the "type" in FIG. 13 indicates that the weather forecast information is weather forecast information with no change range, for example. By contrast, the type information of "upper limit" entered in the "type" in FIG. 14 indicates that the weather forecast information is weather forecast information to which the upper limit of the change range is added. Furthermore, a unique ID (e4089910 and e4089911) for discriminating the weather forecast information from other weather forecast information is entered in the space of the "weather forecast ID".

The main information D12 lists weather forecast values in a predetermined future period calculated for a customer corresponding to the "customer ID" of the additional information D11 in units of one hour. Compared with the weather forecast information to which no change range is added illustrated in FIG. 13, in the weather forecast information to which the change range is added illustrated in FIG. 14, values in accordance with amounts of change are added to the humidity, the $CO_2$ concentration, the wind velocity, the weather, the amount of solar radiation, and the amount of cloud.

As described above, the power management apparatus 30 derives local weather forecast values (reference weather forecast values) in accordance with the existing position of each customer. Furthermore, the power management apparatus 30 adds a change range in accordance with an error (error information) between previous weather forecast and actual weather to the reference weather forecast values, that is, the weather forecast values to generate weather forecast information in consideration of previous actual weather, and provides the weather forecast information to the customer terminal 20 of the corresponding customer. Thus, the accuracy of the weather forecast information provided to each customer (customer terminal 20) can be improved. Therefore, it is possible to improve the accuracy of forecast results (power consumption and the reducible power amount) predicted by using the weather forecast information.

In FIG. 14, the change range is added directly to the reference weather forecast values. However, it is not limited thereto, and the change range may be attached to the reference weather forecast values as independent change range information.

Figure 15:
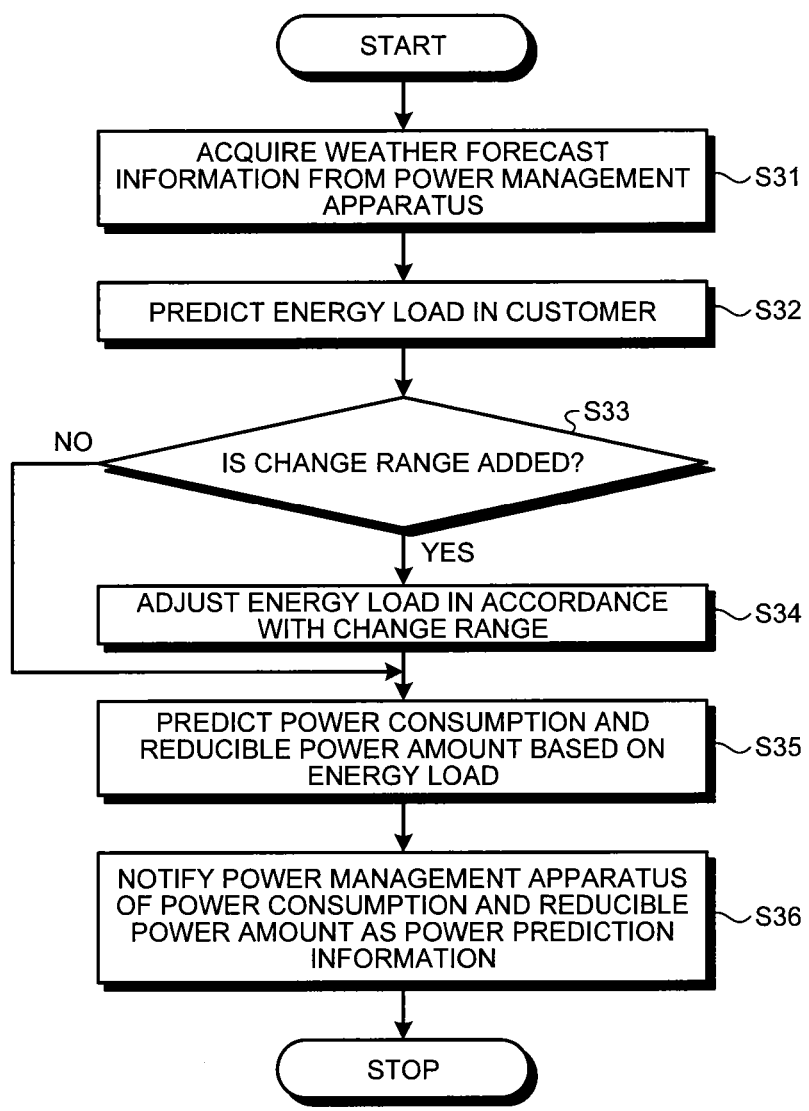
FIG. 15 is a flowchart of an example of power predictive value calculation processing performed by the customer terminal according to the embodiment.

Power predictive value calculation processing performed by the customer terminal 20 will now be described with reference to FIG. 15 and FIG. 16. FIG. 15 is a flowchart of an example of the power predictive value calculation processing performed by the customer terminal 20.

The weather forecast information acquisition unit 21 of the customer terminal 20 acquires weather forecast information for each customer provided from the power management apparatus 30 (Step S31). Subsequently, the power prediction unit 22 uses the weather forecast information acquired at Step S31 and information on an electric load device input in advance to predict an energy load in the customer in a predetermined period forecasted in the weather forecast information (Step S32).

The power prediction unit 22 then determines whether a change range is added to the weather forecast information based on type information attached to the weather forecast information (Step S33). If no change range is determined to be added (No at Step S33), the system control goes to Step S35.

By contrast, if a change range is determined to be added at Step S33 (Yes at Step S33), the power prediction unit 22 adjusts the energy load predicted at Step S32 in accordance with the change range thus added (Step S34). The system control then goes to Step S35.

Subsequently, at Step S35, the power prediction unit 22 predicts power consumption and a reducible power amount in the customer in a predetermined period forecasted in the weather forecast information based on the energy load (Step S35). The power prediction information notification unit 23 then generates the power consumption and the reducible power amount predicted at Step S35 as power prediction information, and notifies the power management apparatus 30 of the power prediction information (Step S36). Subsequently, the present processing is terminated.

FIG. 16 is schematic of an example of the power prediction information generated by the power predictive value calculation processing. As illustrated in the figure, the power prediction information includes additional information D21 and main information D22. The additional information D21 includes a "customer ID", "positional information", and a "weather forecast ID" as items.

In the additional information D21, the customer ID (9910035) and the positional information (990021) of the customer itself are entered in the items of the "customer ID" and the "positional information", respectively. The weather forecast ID (e4089910) of the weather forecast information used for generating the power prediction information is entered in the item of the "weather forecast ID". The main information D22 lists the power consumption and the reducible power amounts in a predetermined period that is a target of the forecast in the weather forecast information in units of one hour.

As described above, the customer terminal 20 predicts the power consumption and the reducible power amount based on the weather forecast information for the customer itself provided from the power management apparatus 30. Therefore, it is possible to reflect an operating plan or the like of the customer and to improve the accuracy of the power consumption and the reducible power amount. Furthermore, if a change range is added to the weather forecast information, the customer terminal 20 predicts the power consumption and the reducible power amount while taking into account the change range. Therefore, it is possible to derive the power consumption and the reducible power amount in consideration of the risk (uncertainties) of the change range.

Figure 17:
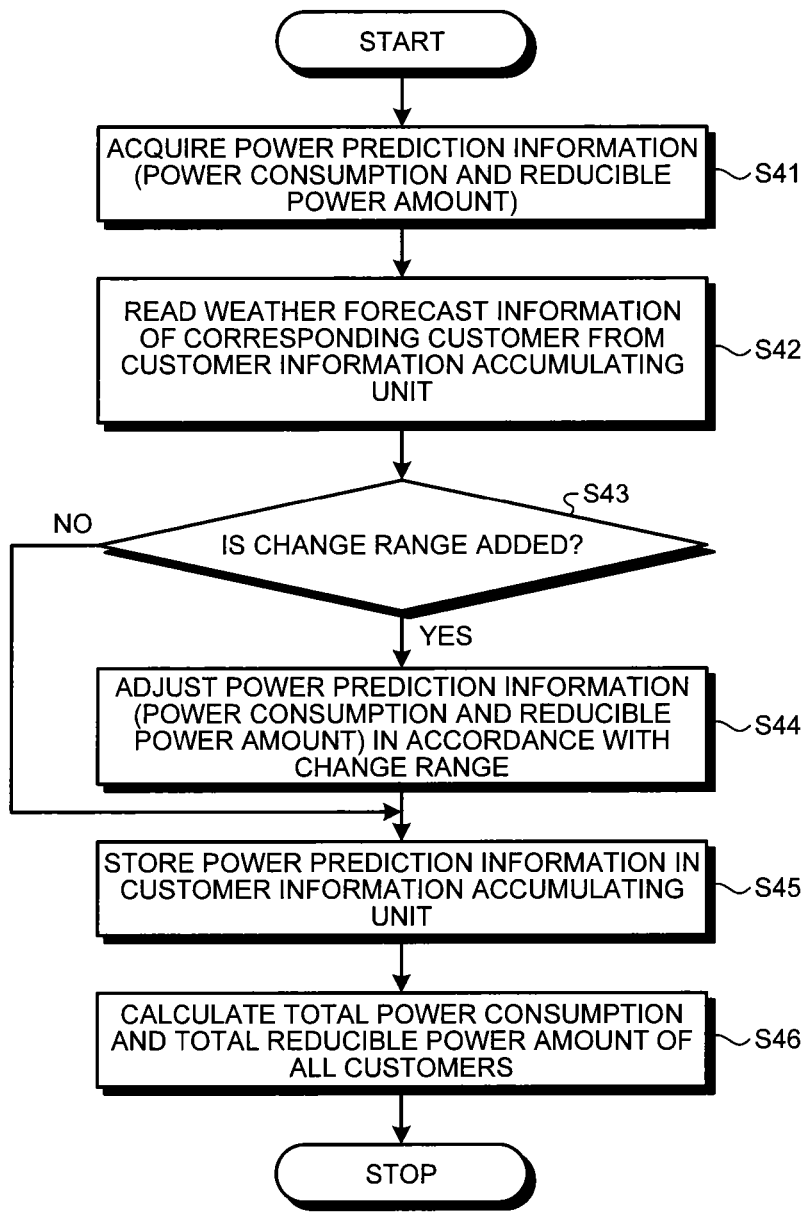
FIG. 17 is a flowchart of an example of power predictive value adjustment processing performed by the power management apparatus according to the embodiment.

Power predictive value adjustment processing performed by the power management apparatus 30 will now be described with reference to FIG. 17. FIG. 17 is a flowchart of an example of the power predictive value adjustment processing performed by the power management apparatus 30.

The power prediction information acquisition unit 35 of the power management apparatus 30 acquires power prediction information (power consumption and a reducible power amount) reported from the customer terminal 20 (power prediction information notification unit 23) of each customer (Step S41).

Subsequently, the power predictive value adjustment unit 36 reads weather forecast information of the customer corresponding to the customer ID of the power prediction information acquired at Step S41 from the customer information accumulating unit 32 (Step S42). The power predictive value adjustment unit 36 then determines whether a change range is added to the weather forecast information based on type information attached to the weather forecast information (Step S43). If no change range is determined to be added (No at Step S43), the system control goes to Step S45.

By contrast, if a change range is determined to be added at Step S43 (Yes at Step S43), the power predictive value adjustment unit 36 adjusts the values of the power consumption and the reducible power amount included in the power prediction information in accordance with the change range to reduce the risk of a weather forecast error caused by the change range (Step S44).

The power predictive value adjustment unit 36 then stores the power prediction information in the customer information accumulating unit 32 in a manner associated with the customer ID of the customer corresponding thereto (Step S45). The integration processing unit 37 then sums up the power consumption and the reducible power amounts, individually, in a predetermined future period accumulated in the customer information accumulating unit 32 to calculate the total power consumption and the total reducible power amount of all the customers (Step S46). Subsequently, the processing is terminated.

As described above, the power management apparatus 30 calculates the total power consumption and the total reducible power amount of all the customers based on the power prediction information provided from the customer terminal 20 of each customer. Therefore, it is possible to estimate the total power consumption and the total reducible power amount of all the customers with high accuracy. Furthermore, if a change range is added to the weather forecast information used for generating the power prediction information, the power management apparatus 30 adjusts the power consumption and the reducible power amount in accordance with the change range. Therefore, it is possible to estimate the total power consumption and the total reducible power amount in consideration of the risk (uncertainties) of the change range.

Figure 18:
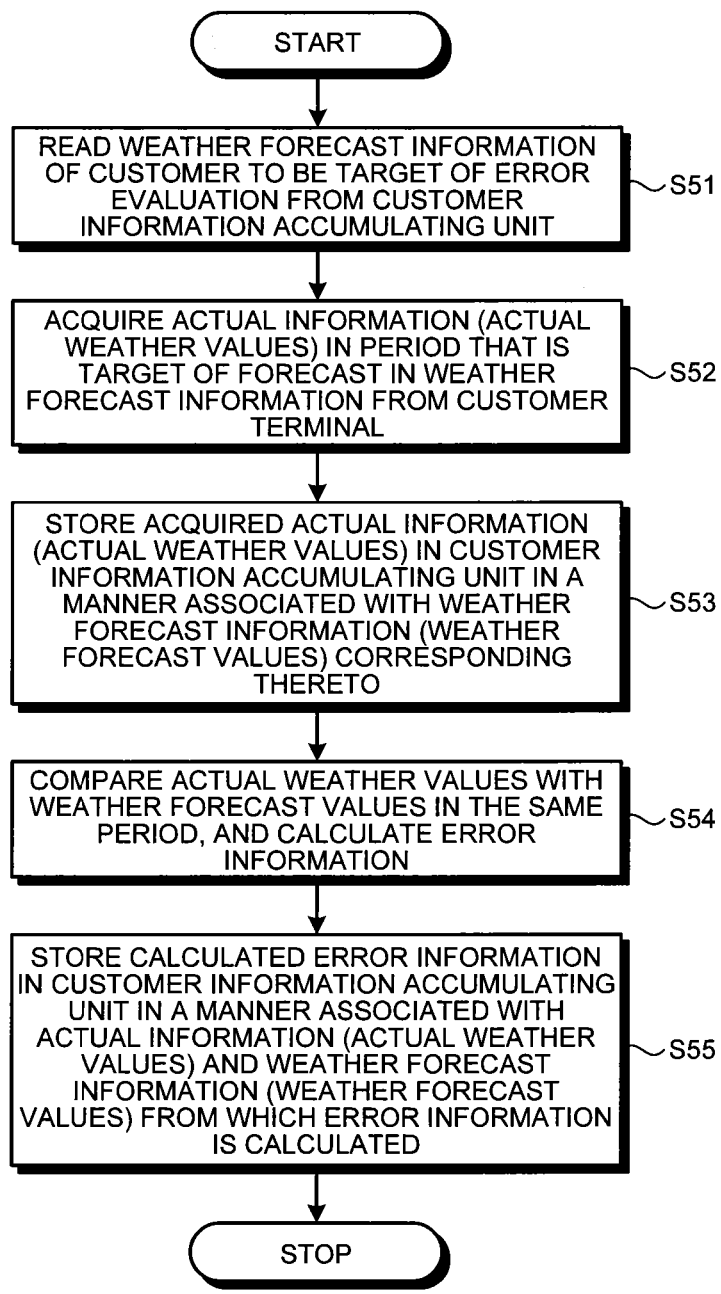
FIG. 18 is a flowchart of an example of error calculation processing performed by the power management apparatus according to the embodiment.

Error calculation processing performed by the power management apparatus 30 will now be described with reference to FIG. 18 and FIG. 19. FIG. 18 is a flowchart of an example of the error calculation processing performed by the power management apparatus 30. As a premise of the present processing, an assumption is made that the actual weather acquisition unit 24 of each customer terminal 20 has already acquired local actual weather values around each customer.

The error calculation unit 39 of the power management apparatus 30 reads weather forecast information of a customer to be a target of error evaluation from the customer information accumulating unit 32 (Step S51). The error calculation unit 39 then acquires actual information (actual weather values) in a period forecasted in the weather forecast information from the customer terminal 20 (actual information providing unit 26) of the customer to be a target of the error evaluation through the actual information acquisition unit 38 (Step S52). The error calculation unit 39 then stores the actual information (actual weather values) acquired from the customer terminal 20 in the customer information accumulating unit 32 in a manner associated with weather forecast information (weather forecast values) corresponding thereto (Step S53).

The error calculation unit 39 then compares the actual information (actual weather values) stored at Step S53 with the weather forecast information (weather forecast values) corresponding to the actual information, that is, compares the weather forecast values and the actual weather values in the same period, and derives difference between both the values, thereby calculating an error in the actual weather values with respect to the weather forecast values as error information (Step S54). The error calculation unit 39 then stores the error information calculated at Step S54 in the customer information accumulating unit 32 in a manner associated with the actual information (actual weather values) and the weather forecast information (weather forecast values) from which the error information is calculated (Step S55).

FIG. 19 is a schematic of an example of the actual information (actual weather values). As illustrated in the figure, the actual information includes additional information D31 and main information D32.

The additional information D31 includes a "customer ID", "positional information", a "type", an "actual ID", and a "weather forecast ID" as items. In the additional information D31, the customer ID (9910035) and the positional information (990021) of the customer from which the actual weather values are acquired are entered in the items of the "customer ID" and the "positional information", respectively. Information (actual) indicating that the information is the actual information is entered in the item of the "type". Identification Information (e4089912) for discriminating the actual information from other actual information is entered in the "actual ID". The weather forecast ID (e4089910) of the weather forecast information related to calculation of error information, that is, the weather forecast information corresponding to measurement time of the actual weather values is entered in the "weather forecast ID". Furthermore, the main information D32 lists the actual weather values in a predetermined period in units of one hour.

When using the actual information of FIG. 19, for example, the error calculation unit 39 compares the actual information with the weather forecast information of "e4089910" entered in the "weather forecast ID", that is, the weather forecast values at the time corresponding to the weather forecast information illustrated in FIG. 13, thereby generating the error information. The error information may be generated for each of the items of the weather forecast values. Alternatively, errors in the items may be integrated by averaging or other methods to generate one piece of error information. Furthermore, the time unit for generating the error information may be one hour, for example. Alternatively, by calculating an average value, for example, one piece of error information may be generated in a predetermined period.

The power management apparatus 30 can feed back the error information derived from the weather forecast values and the actual weather values acquired previously to calculation of the weather forecast information performed by the individual customer weather forecast unit 33. Therefore, it is possible to improve the accuracy of the forecast efficiently.

As described above, the power management system 1 according to the present embodiment predicts the power consumption and the reducible power amount for each customer by using local weather forecast information around each customer, and calculates the total power consumption and the total reducible power amount of all the customers from the power consumption and the reducible power amount predicted for each customer. Therefore, it is possible to predict the power consumption and the reducible power amount of all the customers with high accuracy.

Figure 20:
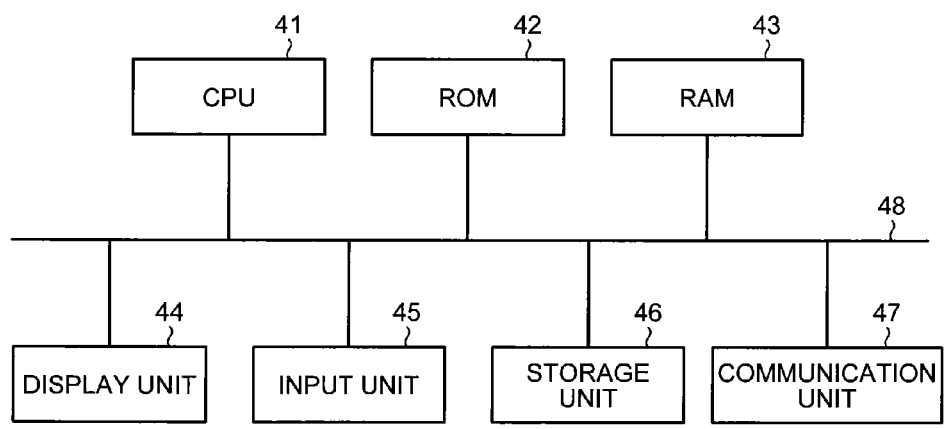
FIG. 20 is a diagram of an exemplary configuration of a computer according to the embodiment.

The weather information providing apparatus 10, the customer terminal 20, and the power management apparatus 30 can be realized by a typical computer. FIG. 20 is a diagram of an exemplary configuration of a computer. As illustrated in the figure, the computer includes a central processing unit (CPU) 41 that performs information processing, a read-only memory (ROM) 42 that is a read-only memory storing therein the basic input/output system (BIOS) and the like, a random access memory (RAM) 43 functioning as a work area for the CPU 41, a display unit 44, such as a cathode ray tube (CRT) and a liquid crystal display (LCD), that displays various types of information, an input unit 45 that is an input device, such as a keyboard and a mouse, a storage unit 46, such as a hard disk drive (HDD), that stores therein various types of computer programs and data, and a communication unit 47 that transmits and receives information to and from an external device via the network N. These units are connected to one another via a bus 48.

In the computer, the CPU 41 starts a computer program stored in the ROM 42 and the storage unit 46, thereby controlling operations of the computer itself collectively and realizing the various types of functional units. In other words, the computer functions as one of the weather information providing apparatus 10, the customer terminal 20, and the power management apparatus 30 depending on the difference of the computer program stored in the ROM 42 and the storage unit 46. As described above, the functional units of the weather information providing apparatus 10, the customer terminal 20, and the power management apparatus 30 can be realized by a software configuration achieved by cooperation of the CPU 41 and the computer program. The method for realizing the functional units of the weather information providing apparatus 10, the customer terminal 20, and the power management apparatus 30 is not limited to the software configuration. Alternatively, by providing a processor for each of the functional units, for example, the functional units may be realized by a hardware configuration.

While the embodiment according to the present invention has been described, the embodiment has been presented by way of example only, and is not intended to limit the scope of the invention. Indeed, the novel system and method described herein may be embodied in a variety of other forms; furthermore, various omissions, substitutions, changes, combinations, additions, and other modifications in the form of the system and method described herein may be made without departing from the spirit of the invention. The accompanying claims and their equivalents are intended to cover the embodiment and the modifications as would fall within the scope and spirit of the invention.

While the power management system 1 according to the embodiment includes the weather information providing apparatus 10, the power management system 1 may use weather information provided from a third party, for example. Specifically, the Japan Meteorological Agency makes weather forecast in units of one month available besides weather forecast of three days just coming and weekly forecast. In terms of the hours of sunshine, the temperature, and the amount of precipitation, for example, a probability lower (smaller) than that in the average year, a probability equivalent to that in the average year, and a probability higher (larger) than that in the average year can be acquired as data from the monthly forecast. Therefore, the power management apparatus 30 may acquire weather forecast provided from the third party described above, and use the weather forecast as wide-area weather forecast information.

Furthermore, in the embodiment, both the customer terminal 20 and the power management apparatus 30 perform processing in accordance with the change range added to the weather forecast information for each customer. However, it is not limited thereto, and one of the apparatuses may perform the processing in accordance with the change range. The customer terminal 20 may generate power prediction information (power consumption and the reducible power amount) from the weather forecast information without regard to the change range, for example, and the power management apparatus 30 may perform adjustment processing in accordance with the change range on the power prediction information.

The computer program executed in the apparatuses according to the embodiment is provided in a manner incorporated in advance in a storage medium included in each of the apparatuses. However, it is not limited thereto, and the computer program may be provided in a manner recorded in a computer-readable recording medium, such as a compact disk read-only memory (CD-ROM), a flexible disk (FD), a compact disk recordable (CD-R), and a digital versatile disk (DVD), as a file in an installable or executable format. Furthermore, the storage medium is not necessarily a medium separated from the computer or an embedded system. Examples of the storage medium include a storage medium that stores therein or temporarily stores therein the computer program transmitted and downloaded via a local area network (LAN) or the Internet.

The computer program executed in the apparatuses according to the embodiment may be provided in a manner stored in a computer connected to a network such as the Internet to be made available for downloads via the network, or may be provided or distributed over a network such as the Internet.

The invention claimed is:

1. A power management system comprising:
    customer terminals; and
    a power management apparatus connected to the customer terminals, wherein each of the customer terminals includes
        a weather forecast acquisition unit that acquires a local weather forecast for a corresponding customer terminal, and
        a power prediction unit that predicts a power consumption and an amount of power that can be reduced for a predetermined period based on the weather forecast, and
    the power management apparatus includes
        an integration processing unit that integrates the power consumptions and the amounts of power that can be reduced that are predicted for the respective customer terminals to calculate a total power consumption and a total amount of power that can be reduced for all of the customer terminals,
        a wide-area weather forecast acquisition unit that acquires a wide-area weather forecast,
        a weather forecast unit that derives the local weather forecast for the corresponding customer terminal based on the wide-area weather forecast and an existing position of the customer terminal in an area corresponding to the wide-area weather forecast, wherein
    the weather forecast acquisition unit acquires the local weather forecast for the corresponding customer terminal that is derived by the weather forecast unit,
    each of the customer terminals further includes an actual weather acquisition unit that acquires an actual local weather of the corresponding customer terminal,
    the power management apparatus further includes an error calculation unit that calculates error information by using the actual weather acquired by each of the customer terminals and the weather forecast corresponding to the customer terminal and a period in which the actual weather is acquired, wherein
    the weather forecast unit adds a change range in accordance with the error information to the weather forecast,
    the power management apparatus further includes an adjustment unit that adjusts the power consumption and the amount of power that are predicted in the customer terminal in accordance with the change range added to the weather forecast for the customer terminal.

2. The power management system of claim 1, wherein, the weather forecast unit adds the change range in accordance with the error information to the weather forecast when the error information exceeds a predetermined threshold.

3. The power management system of claim 2, wherein when the change range is added to the weather forecast, the power prediction unit predicts the power consumption and the amount of power that can be reduced by using the change range.

4. The power management system of claim 1, wherein the wide-area weather forecast acquisition unit acquires the wide-area weather forecast from a third party that makes a weather forecast for a wide area including an area in which the customer terminals exist.

5. The power management system of claim 1, the weather forecast includes at least one of elements including temperature, humidity, $CO_2$ concentration, a wind direction, wind velocity, weather, an amount of solar radiation, cloud cover, an amount of precipitation, and an amount of snowfall.

6. A power management method comprising:
- acquiring, by a weather forecast acquisition unit, a local weather forecast for each of customer terminals;
- predicting, by a power prediction unit, a power consumption and an amount of power that can be reduced for a predetermined period based on the weather forecast;
- integrating, by an integration processing unit, the power consumptions and the amounts of power that can be reduced that are predicted for the respective customer terminals to calculate a total power consumption and a total amount of power that can be reduced for all of the customer terminals;
- acquiring, by a wide-area weather forecast acquisition unit, a wide-area weather forecast,
- deriving by a weather forecast unit, the local weather forecast for the corresponding customer terminal based on the wide-area weather forecast and an existing position of the customer terminal in an area corresponding to the wide-area weather forecast, wherein
- the acquiring by the weather forecast acquisition unit includes acquiring the local weather forecast for the corresponding customer terminal that is derived by the weather forecast unit,
- the method further includes acquiring, an actual weather acquisition unit, an actual local weather of the corresponding customer terminal,
- calculating, by an error calculation unit, error information by using the actual weather acquired by the each of the customer terminals and the weather forecast corresponding to the customer terminal and a period in which the actual weather is acquired,
- adding, by the weather forecast unit, a change range in accordance with the error information to the weather forecast,
- adjusting, by an adjustment unit, the power consumption and the amount of power that are predicted in the customer terminal in accordance with the change range added to the weather forecast for the customer terminal.

* * * * *